(12) United States Patent
Fujimaru et al.

(10) Patent No.: US 8,765,857 B2
(45) Date of Patent: Jul. 1, 2014

(54) PARTICULATE WATER RETAINING MATERIAL FOR CULTIVATING PLANT HAVING WATER ABSORBENT RESIN AS MAIN COMPONENT

(75) Inventors: Hirotama Fujimaru, Osaka (JP);
Yorimichi Dairoku, Hyogo (JP);
Kunihiko Ishizaki, Osaka (JP);
Yoshifumi Adachi, Hyogo (JP);
Nobuyuki Harada, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 1140 days.

(21) Appl. No.: 10/581,343

(22) PCT Filed: Dec. 6, 2004

(86) PCT No.: PCT/JP2004/018521
§ 371 (c)(1),
(2), (4) Date: Jun. 2, 2006

(87) PCT Pub. No.: WO2005/055381
PCT Pub. Date: Jun. 16, 2005

(65) Prior Publication Data
US 2007/0101644 A1    May 10, 2007

(30) Foreign Application Priority Data
Dec. 5, 2003   (JP) .................. 2003-406784

(51) Int. Cl.
*C08K 3/26*   (2006.01)
*C08K 3/22*   (2006.01)
*C08F 220/06* (2006.01)
*A01G 7/00*   (2006.01)

(52) U.S. Cl.
USPC ........... 524/427; 524/425; 524/433; 524/456; 524/556; 47/58.1 SC

(58) Field of Classification Search
USPC .................. 524/556, 425, 427, 433, 456; 47/58.1 SC
See application file for complete search history.

(56) References Cited

U.S. PATENT DOCUMENTS

| 4,093,776 A | 6/1978 | Aoki et al. |
| 4,286,082 A | 8/1981 | Tsubakimoto et al. |
| 4,367,323 A | 1/1983 | Kitamura et al. |
| 4,446,261 A | 5/1984 | Yamasaki et al. |
| 4,587,308 A * | 5/1986 | Makita et al. .............. 525/373 |

(Continued)

FOREIGN PATENT DOCUMENTS

| EP | 0 945 052 A1 | 9/1999 |
| EP | 945052 A1 * | 9/1999 |

(Continued)

OTHER PUBLICATIONS http://www.wovenwire.com/reference/particle-size.htm.*

(Continued)

*Primary Examiner* — Satya Sastri
(74) *Attorney, Agent, or Firm* — Buchanan Ingersoll & Rooney PC

(57) ABSTRACT

A particulate water retaining material for cultivating plant comprising (A) a carboxyl group-containing water-insoluble water absorbent resin and (B) a polyvalent metal compound, by having the compound (B) deposited on the rerin (A), it is made possible to possess an outstanding water absorbing property without impairing the growth of a plant.

16 Claims, 2 Drawing Sheets

(A)

(C)

(B)

(D)

(56) References Cited

U.S. PATENT DOCUMENTS

| | | | |
|---|---|---|---|
| 4,625,001 A | 11/1986 | Tsubakimoto et al. | |
| 4,683,274 A | 7/1987 | Nakamura et al. | |
| 4,873,299 A | 10/1989 | Nowakowsky et al. | |
| 4,973,632 A | 11/1990 | Nagasuna et al. | |
| 4,985,518 A | 1/1991 | Alexander et al. | |
| 5,026,800 A * | 6/1991 | Kimura et al. | 526/200 |
| 5,051,259 A | 9/1991 | Olsen et al. | |
| 5,115,011 A * | 5/1992 | Harada et al. | 524/419 |
| 5,124,416 A | 6/1992 | Haruna et al. | |
| 5,140,076 A * | 8/1992 | Hatsuda et al. | 525/375 |
| 5,145,906 A | 9/1992 | Chambers et al. | |
| 5,244,735 A | 9/1993 | Kimura et al. | |
| 5,250,640 A | 10/1993 | Irie et al. | |
| 5,264,495 A | 11/1993 | Irie et al. | |
| 5,380,808 A | 1/1995 | Sumiya et al. | |
| 5,382,610 A | 1/1995 | Harada et al. | |
| 5,549,590 A * | 8/1996 | Suskind et al. | 604/368 |
| 6,071,976 A | 6/2000 | Dairoku et al. | |
| 6,228,930 B1 | 5/2001 | Dairoku et al. | |
| 6,254,990 B1 | 7/2001 | Ishizaki et al. | |
| 6,286,254 B1 | 9/2001 | Obonai et al. | |
| 6,615,539 B1 | 9/2003 | Obonai et al. | |
| 2003/0020199 A1* | 1/2003 | Kajikawa et al. | 264/140 |

FOREIGN PATENT DOCUMENTS

| | | | |
|---|---|---|---|
| EP | 0 811 636 B1 | | 8/2001 |
| EP | 0 955 086 B1 | | 9/2003 |
| EP | 0 922 717 B1 | | 1/2005 |
| JP | 58-042602 A | | 3/1983 |
| JP | 60-163956 A | | 8/1985 |
| JP | 62-273283 A | | 11/1987 |
| JP | 63-068026 A | | 3/1988 |
| JP | 64-051028 A | | 2/1989 |
| JP | 02178332 A | * | 7/1990 |
| JP | 06-000370 A | | 1/1994 |
| JP | 9-78050 A | | 3/1997 |
| JP | 09078050 A | * | 3/1997 |
| JP | 10036118 A | * | 2/1998 |
| JP | 2000-139208 A | | 5/2000 |
| WO | WO 98/49252 A1 | | 11/1998 |
| WO | WO 9849252 A1 | * | 11/1998 |

OTHER PUBLICATIONS

JP 02178332 A, Isomi et al., Jul. 1990, Derwent Ab.*
Handbook of Fillers, George Wypych, $2^{nd}$ Ed., Year 2000, pp. 1, 132, 154.*
JP10026118A, Derwent Ab, Feb. 1998, Derwent Ab.*
Written Opinion from PCT/JP2004/018521.
International Search Report from PCT/JP2004/018521.
International Preliminary Examination Report from PCT/JP2004/018521.
Communication dated Feb. 12, 2007 from corresponding EPO application.
Office Action issued Jul. 4, 2008, in corresponding Chinese Patent Application No. 200480035906.1 and English translation thereof.
Kawashima, Kazuo et al., "*Influences on the early growth of vegetables by a super absorbent with cross-linked forms of polyacrylate*", 1984, pp. 7-8, 31(1), Sakyu-Kenkyu, JP (English translation attached).
Takakura, Tadashi, "*Growth of Plants and Environment*", Plant Nutrition Edition, 2003, pp. 162-163, 1, Noubunkyo, JP (English translation attached).
Office Action from European Patent Office issued in corresponding European Application No. 04 801 670.3 dated Sep. 22, 2010.
Official Action dated Mar. 8, 2011, issued by the Japanese Patent Office in corresponding application No. 2006-520451, and partial English language translation of the Official Action.

* cited by examiner (C)

(B)

(A)

PARTICULATE WATER RETAINING MATERIAL FOR CULTIVATING PLANT HAVING WATER ABSORBENT RESIN AS MAIN COMPONENT

TECHNICAL FIELD

This invention relates to a water retaining material for use in cultivating a plant. More particularly, the invention relates to a water retaining material for cultivating plant which, in the growth of a plant, manifests the function as a source for supply of water to the plant and promotes satisfactory growth of the plant, promotes soil conditioning and tree planting through application to soil and sandy field, and enables a plant to be supported and retained. More specifically, the invention concerns a water retaining carrier for a plant which, when used as a water retaining carrier in paddy field cultivation, outdoor cultivation, water saving cultivation, and tree planting, exhibits a high water absorbing speed and excels in convenience of handling and causes no obstruction to plant growth. Rather, it should be called a water retaining material for growth a plant and can be used in a high concentration as a swelled hydrogel carrier in a soil promoting a plant growth.

BACKGROUND ART

In recent years, the water absorbent resins have been being utilized extensively as a main ingredient for such sanitary materials (absorbent articles) as disposable diapers, sanitary napkins, and incontinence pads with the object of absorbing humors (urine and blood). As concrete examples of the water absorbent resins mentioned above, polycarboxylic acid water absorbent resins including such polyacrylic acid water absorbent resins as partially neutralized crosslinked polyacrylic acids and hydrolyzates of starch-acrylonitrile graft polymers may be cited. Among other water absorbent resins, the polyacrylic acid water absorbent resins are used in particularly large amounts because of low prices and excellent solid state properties.

Also in recent years, the water absorbent resins have come to find growing adoption for agriculture and horticulture besides sanitary materials by virtue of their low prices and their ability to retain water. The polyacrylic acid water absorbent resins mentioned above, for example, are being utilized as water retaining materials for tree planting, water saving cultivation, and sandy field cultivation by virtue of their ability to retain water (refer to the JP-A 1983-42602, the JP-A 1988-68026, and the JP-A 1989-51028, for example). Further, the water absorbent resins using ammonium salts of polyacrylic acids have been disclosed with a view to providing water retaining agents which exert no adverse effects on plant growth (refer to the JP-A 1987-273283, for example). The JP-A 2000-139208 has disclosed a technique which concerns polyacrylic acid water absorbent resins improved to overcome the obstruction to plant growth.

It has been demonstrated, however, that when the conventional polyacrylic acid water absorbent resins disclosed in the JP-A 1983-42602, the JP-A 1988-68026, and the JP-A 1989-51028, for example, are used as water retaining agents for plant growth, they exert adverse effects on the growth of plants and induce particularly serious hindrance to rhizogenesis and growth of roots (Kazuo Kawashima et al., "Effects of highly water absorbing polymer substances on initial growth of crops," Sakyu Kenkyu, 31 (1), 1-8, 1984). It has been also demonstrated that calcium is indispensable to the rhizogenesis and the growth of roots in plants (Sunao Takakura, "Growth of plants and environment," Nobunkyo, Table 5-2, page 162).

Thus, the use of the technique disclosed in the JP-1987-273283 which resides in simply changing the counterion of carboxylic acid from the conventionally generally used sodium salt to the ammonium salt has been incapable of repressing the conspicuous obstruction to rhizogenesis and growth of roots. When the conventional polyacrylic acid water absorbent resin is used for tree planting, therefore, the amount of the resin to be used is restricted to only not more than several wt. % based on the amount of soil, for example, lest the seedlings or seeds of a plant should suffer serious hindrance of growth due to direct contact with the polyacrylic acid water absorbent resin. Thus, the decrease in frequency of irrigation and the effect of water retention have not been satisfactorily manifested. Especially, it did not use for growing a plant in a state of swelled hydrogel without mixing other carrier. Therefore it did not use as a water retaining carrier of plant growth for interior such as a propagation by cutting, hydro culture, flower arrangement.

The technique disclosed in the specification of U.S. Pat. No. 6,286,254 prevents the inhibition of growth by preparing a water retaining carrier for plant growth which includes a hydrogel forming polymer having a calcium ion absorbing capacity of less than 50 mg based on the dry weight and exhibiting a absorption capacity of not less than 100 times the original volume in deionized water (at room temperature of 25° C.) and avoiding to deprive the plant of calcium necessary for the growth of the plant. It is, however, described in the specification of U.S. Pat. No. 6,286,254 that the hydrogel obtained by swelling the cross-linked copolymer of acrylamide and acrylic acid or the acrylic acid water absorbent resin with water suffers a conspicuous decline of the water absorbing speed because it is doped with such a water-soluble- or a water-easy soluble-polyvalent metal as calcium chloride. Since the hydrogel thus suffers the decline in the water absorbing speed in spite of a high water absorbing ratio, the irrigation water can not be kept in a soil by decreasing the amount of water absorbed in the absorbent resin. Therefore, the actual use thereof in soil induces a decrease in the efficiency of irrigation due to the loss by scattering.

The technique disclosed in the JP-A 2000-139208 prevents the inhibition of the growth of a plant by using an acrylic acid water absorbent resin having a calcium ion absorbing capacity in the range of 0-100 mg per 1 g of the dry weight and a chlorine ion content in the range of 0.07-7 mmols per 1 g of the dry weight as a water retaining carrier for a plant and consequently promoting the absorption of calcium in the plant. The technique disclosed in the JP-A 2000-139208, however, suffers a large decline of the ability to absorb water because of a cross-linking with a polyvalent metal similarly to the technique disclosed in the specification of U.S. Pat. No. 6,286,254 because the water absorbent resin in a highly hydrated state undergoes mixture with such a polyvalent metal as calcium chloride and consequently suffers the polyvalent metal to be distributed uniformly in the whole water absorbent resin. Particularly the water retaining material incurs a decline in the water absorbing speed. When this water retaining material during its actual use is mixed with soil and then irrigated, therefore, it entails the problem of losing the efficiency of irrigation because it fails to absorb sufficiently the water used for the irrigation and consequently suffers the water to flow out. The technique disclosed in the JP-A 2000-139208 exposes the devices and the equipment used for actual commercialization to heavy load and damage because the water retaining material contains a chlorine ion. Further, the addition of deliquescent calcium chloride, for example, results in impairing the hygroscopic fluidity (Anti-caking property/Anti-blocking property) and the fluidity of the water retaining material and accordingly posing the property of handling the powder as a problem. Because of the presence of the chlorine ion, the water retaining material causes problems at firing it, and others it is suffered to accumulate and consequently pose an environmental problem on being repeatedly scattered on the soil, for example. Thus, in the prior art, since the water absorbing characteristic manifested by the water retaining material for plant growth as the water retaining material and the growth promoting characteristic manifested thereby on the plant being grown contradict each other, it has been extremely difficult to provide a water retaining material for plant growth which reconciles these two characteristics.

The task which this invention aims to fulfill resides in affording a water retaining material for plant growth possessing the water absorbing characteristic and the plant growth promoting characteristic which have been contradicting each other hitherto and consequently providing a novel water retaining material for cultivating plant which is veritably excellent in the efficiency of irrigation and useful for soil conditioning and tree planting. Furthermore, it is to provide a novel water retaining material for plant growth which enable to use in a soil in a high concentration, thereby cultivating a plant in a swelled gel directly.

DISCLOSURE OF THE INVENTION

The present inventors have continued a diligent study with a view to solving the task mentioned above and, as a result, have found that a water retaining material for cultivating plant causing no hindrance to the growth of a plant and possessing an excellent water absorbing characteristic is attained by causing a carboxyl group-containing water absorbent resin to have a specific polyvalent metal compound deposited on the individual particles of this water absorbent resin. This invention has been consequently perfected.

When the water retaining material for cultivating plant of this invention is used for a plant, it promotes the rhizogenesis of this plant by way of plant growth without suffering from calcium ion deficiency. Moreover, this water retaining material excels in the water retaining characteristic for a plant growth material as manifested by the high water absorbing speed and the high saturated absorption capacity and, therefore, enjoys an exalted efficiency of irrigation and permits satisfactory supply of water to a plant. Further, the water retaining material for cultivating plant of this invention carries such nutrient salts for a plant as calcium salts or calcium compounds and, therefore, promotes the growth of a plant and, by adjusting the solubility of the carried compounds in water, permits continued gradual release of the nutrient salts over a long period. The water retaining material for cultivating plant of this invention can be used in a soil in a high concentration, thereby cultivating a plant in a swelled gel of the material directly. The water retaining material for cultivating plant provided by this invention further excels in the operational efficiency, namely the ease of handling, because it exhibits an excellent powder fluidity.

BEST MODE OF EMBODYING THE INVENTION

Figure 1:
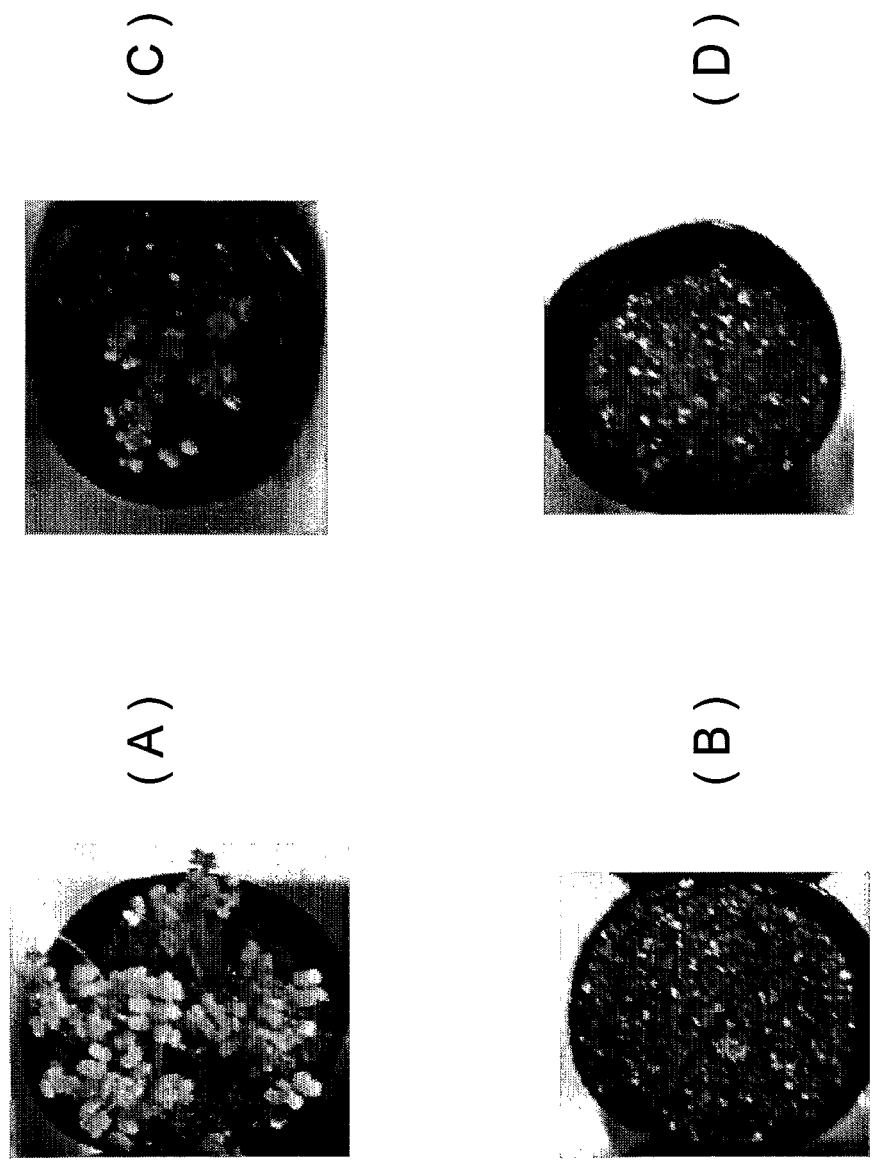
FIG. 1 is a drawing to show results of plants growth in Example 17.
(A) In culture medium mixed with water retaining material for cultivating plant (1) and soil.
(B) In water absorbent resin (1) and a soil.
(C) In culture soil.
(D) In culture medium mixed with water absorbent resin (1), culture soil and calcium sulfate.

The first aspect of this invention is directed toward a particulate water retaining material for cultivating plant Comprising (A) a Carboxylic group-containing water-insoluble water absorbent resin and (B) a polyvalent metal compound, which material exhibits an absorbing speed (absorption capacity in deionized water for 10 minutes) in the range of 20-500 g/g and has a weight average particle diameter in the range of 200-10,000 μm. The second aspect of this invention is directed toward a particulate water retaining material for cultivating plant comprising (A) a carboxylic group-containing water-insoluble water absorbent resin and (B) a polyvalent metal compound, and which material exhibits a calcium gradual release index of more than 0 and not more than 50 mg/L and has a weight average particle diameter in the range of 200-10,000 μm.

The present inventors have made a detailed study in search of essential elements which cause a former water absorbent resin to induce obstruction of plant growth and, as a result, have found that plants have a high demand for calcium while their rhizogenesis and germination, that their seeds, when directly sown in a water absorbent resin, seize the calcium in the water of irrigation owing to the sodium carboxylic acid contained in the resin and impose a limit on the utilization ratio of calcium of the plants, that the water absorbent resin seizes calcium stored in a plant through the root of the plant immediately after the germination and consequently lowers the germination ratio and the rhizogenesis ratio in consequence of the shortage of calcium, and that the plants, even when they come out their roots, are incapable of taking the roots in the water absorbent resin and consequently suffers insufficient congestion of water and further promote shortage of the calcium indispensable to the plant growth and accordingly lower the germination ratio and the rhizogenesis. Particularly when the water absorbent resin contains the carboxylate (salt) group, it is liable to seize calcium and induce a hindrance to the rhizogenesis.

This invention, however, is enabled to exalt the ability of the water absorbent resin to supply the calcium to the plant without degrading the water absorbing properties such as the saturated absorption capacity and the water absorbing speed by causing the water absorbent resin to contain a specific amount of calcium in the surface thereof. As concrete examples of the water absorbent resin which excels particularly in biodegradability, polyamino acids and their products of crosslinkage may be cited. Also the salts of carboxyl group which are contained in these water absorbent resins, however, are liable to seize calcium and induce hindrance to the rhizogenesis. This invention, however, contemplates exalting the ability of the water absorbent resin to supply calcium to a plant and promoting the growth of the plant without degrading such water absorbing properties as the saturated absorption capacity and the water absorbing speed by causing the water absorbent resin to contain a specific amount of calcium in the surface thereof. Further, since the water absorbent resin veritably excels in the water absorbing properties, particularly the water absorbing speed as a water retaining material and, therefore, absorbs quickly the water sprayed to the soil, for example, it only slightly incurs loss of water by outflow or transpiration and, in such agricultural applications as tree planting in a desert or a sandy soil, enjoys a high efficiency of irrigation and a very low frequency of irrigation. Since past water absorbent resin absorbed a calcium, the particulate water retaining material for cultivating plant of this invention possesses an ability to release calcium because it has a gradual calcium release index exceeding 0 and not exceeding 50 mg/L. Thus, it is capable of supplying a nutrient (calcium) indispensable to a plant. Now, this invention will be described in detail below.

(1) Water Absorbent Resin (A)

The term "water absorbent resin (A)" used in this invention refers to a cross-linked polymer which assumes a particulate form in the water retaining material for cultivating plant or before preparing the water retaining material, possesses an ability to form a hydrogel, and exhibits an ability to swell in water and insolubility. The ability to swell in water, for example, designates the absorption of such a large amount of water as to exhibit a saturated absorption capacity in the range of 20-1,000 g/g, preferably 50-1,000 g/g, and more preferably 100-1,000 g/g and the ability to resist solubility in water designates the uncrosslinked water-soluble component (the water-soluble polymer) of the water absorbent resin falling preferably in the range of 0-50 wt. %, more preferably 0-25 wt. %, still more preferably 0-20 wt. %, particularly preferably 0-15 wt. %, more particularly preferably 0-10 wt. %, and most preferably 0-7 wt. %. If the amount of the water-soluble component exceeds 50 wt. %, the overall will possibly result in inducing inhibition of the growth due to the occurrence of elution and degrading the effect of plant growth. Further, the fact that the shape retaining effect after absorbing water possibly decreases and prevents a seed from being fixed in the resin. Incidentally, the values of the saturated absorption capacity and the water-soluble component will be determined by the methods of determination specified in the working example which will be cited herein below.

Polyamides type water absorbent resin such as poly asparaginic acid cross-linked polymer and γ-glutamic acid cross-linked polymer, a natural material used absorbent resin such as CMC cross-linked polymer are cited as a water absorbent resin in this invention, it is more preferable to use a water absorbent resin obtained by polymerizing an unsaturated monomer and having an internal cross-linked structure therein from the viewpoint of absorption characteristic. Further, the individual particles of the water absorbent resin may possess an organic secondary cross-linked structure on their surfaces. As concrete examples of the water absorbent resin of this description, the partially neutralized polymer of polyacrylic acid, the hydrolyzate of starch-acrylonitrile graft polymer, the starch-acrylic acid graft polymer, the saponified vinyl acetate-acrylic ester copolymer, the cross-linked products thereof, cross-linked polymer of the hydrolyzate of acrylonitrile copolymer or acrylamide copolymer, the degenerated products of carboxyl group-containing cross-linked polyvinyl alcohol, and the cross-linked isobutylene-maleic anhydride copolymer may be cited. These water absorbent resins may be used either singly or in the form of a mixture of two or more members. Preferably, the partially neutralized polymer of polyacrylic acid obtained by polymerizing and cross-linking a monomer formed mainly of acrylic acid and/or a salt (neutralized product) is used. Now, the raw materials for the water absorbent resin to be used in the water retaining material for cultivating plant of this invention and the reaction conditions to be employed for the production thereof will be explained below.

(a) Unsaturated Monomer

The unsaturated monomer (hereinafter referred to simply as a "monomer") is preferred to use acrylic acid and/or a salt thereof as a main component. It may be used in combination with other monomer. As concrete examples of the other monomer available therefor, methacrylic acid, maleic acid (anhydride), fumaric acid, crotonic acid, itaconic acid, vinyl sulfonic acid, 2-(meth)acrylamide-2-methylpropanesulfonic acid, (meth)acryloxyalkane sulfonic acid and alkali metal salts and ammonium salts thereof, and monomers having such water-soluble or hydrophobic unsaturated monomers as N-vinyl-2-pyrrolidone, N-vinyl acetamide, (meth)acrylamide, N-isopropyl(meth)-acrylamide, N,N-dimethyl(meth)acrylamide, 2-hydroxyethyl(meth)acrylate, methoxypolyethylene glycol(meth)acrylate, polyethylene glycol(meth)acrylate, isobutylene, and lauryl(meth)acrylate as copolymerizing components may be cited.

When this invention uses a monomer other than acrylic acid (salt), this monomer other than acrylic acid (salt) accounts for a proportion of preferably not more than 30 mol % (the lower limit 0 mol %), more preferably not more than 10 mol %, and most preferably not more than 5 mol % based on the total amount of the acrylic acid and salt thereof used as the main component. If this proportion exceeds 30 mol %, the overage will be at a disadvantage in increasing the uncrosslinked water-soluble component. When the proportion falls in the aforementioned range, the water retaining material for cultivating plant to be finally obtained can be endowed with such other functions as the antibacterial property than the plant growth promotion and the water absorbing property and this water retaining material for cultivating plant can be obtained more inexpensively as well.

Incidentally, when the monomer happens to have an acid group-containing unsaturated monomer, the salts thereof may include alkali metal salts, alkaline earth metal salts, and ammonium salts. Among other salts mentioned above, sodium salts, potassium salts, and ammonium salts prove particularly favorable from the viewpoint of the function of the produced water retaining material for cultivating plant, the ease of commercial procurement, and safety. By using a salt combining two or more members selected from the group consisting of the sodium salts, potassium salts, and ammonium salts mentioned above, still better promotion of plant growth may be attained probably, though not indubitably, because of the physiological action within the plant.

Particularly, as regards the salt of the carboxyl group-containing unsaturated monomer and the amount of the counterion of that salt, the amount of the monovalent counterion such as, for example, sodium ion, potassium ion, or ammonium ion is preferably not less than 1 mol %, preferably not less than 10 mol %, and more preferably not less than 15 mol % based on the number of mols of the carboxyl group. The amount of the monovalent counterion is preferably not more than 75 mol %, more preferably not more than 70 mol %, still more preferably not more than 65 mol %, next preferably not more than 60 mol %, particularly preferably not more than 55 mol %, more particularly preferably not more than 50 mol %, and most preferably not more than 40 mol % based on the number of mols of the carboxyl group. To be specific, the amount of the monovalent counterion based on the carboxyl group is generally in the range of 0-75 mol %, preferably in the range of 5-75 mol %, more preferably in the range of 5-70 mol %, still more preferably in the range of 10-70 mol %, yet more preferably in the range of 10-65 mol %, next preferably in the range of 10-60 mol %, particularly preferably in the range of 20-60 mol %, more particularly preferably in the range of 20-55 mol %, and most preferably in the range of 20-40 mol % based on the number of mols of the carboxyl group mentioned above.

If the amount of the monovalent counterion of the carboxyl group possessed by the water absorbent resin (A) falls short of 5 mol %, particularly 1 mol %, the shortage will be at a disadvantage in possibly degrading the water absorption properties such as, for example, the saturated absorption capacity and the water absorbing speed, of the plant growth glade water retaining material. If the amount of the monovalent counterion exceeds 75 mol %, particularly 90 mol %, the overage will be at a disadvantage in possibly inducing inhibition of the growth of the plant because of the addition to the absorbing capacity of the carboxyl group-containing water absorbent resin itself manifested for such useful nutrient salts for plant as magnesium, calcium, and zinc. Incidentally, the amount of the monovalent counterion means the ratio of neutralization (indicating the mol % of the aforementioned acrylic acid salt) of acrylic acid with such a monovalent alkali metal as sodium or potassium or ammonia or amine. To form the salt mentioned above, the acrylic acid in the form of a monomer may be neutralized with sodium hydroxide, sodium carbonate, potassium hydroxide, ammonia or ammonium carbonate, or the acrylic acid and an acrylate may be mixed. Otherwise, the acrylic acid in the process of polymerization or after the polymerization may be neutralized as a polymer. The measures described above may be employed in combination.

(b) Cross-Linking Monomer (Internal Cross-Linking Agent)

The water absorbent resin essentially requires a cross-linked structure. It may possess a self-crosslinking structure having no need for any cross-linking monomer. The water absorbent resin obtained by copolymerizing or reacting a cross-linking monomer possessing not less than two polymerizable unsaturated groups or not less than two reactive groups in the molecular unit (otherwise called an internal cross-linking agent of water absorbent resin) proves more preferable. As concrete examples of the internal cross-linking agent, N,N'-methylenebis(meth)acrylamide, (poly)ethylene glycol di(meth)acrylate, (poly)propylene glycol di(meth) acrylate, trimethylol propane tri(meth)acrylate, glycerin tri (meth)acrylate, glycerin acrylate methacrylate, ethylene oxide-modified trimethylol propane tri(meth)acrylate, pentaerythritol hexa(meth)acrylate, triallyl cyanurate, triallyl isocyanurate, triallyl phosphate, triallyl amine, poly(meth) allyloxy alkane, (poly)ethylene glycol diglycidyl ether, glycerol diglycidyl ether, ethylene glycol, polyethylene glycol, propylene glycol, glycerin, pentaerythritol, ethylene diamine, ethylene carbonate, propylene carbonate, polyethylene imine, and glycidyl(meth)acrylate may be cited.

These internal cross-linking agents may be used either singly or in the form of a mixture of two or more members. Further, these internal cross-linking agents may be added either collectively or piecemeal to the reaction system. When at least one or two or more of these internal cross-linking agent are used, it is commendable to use essentially during the course of polymerization a compound possessing not less than two polymerizable unsaturated groups in consideration of the absorption characteristics of the water absorbent resin or the water retaining agent for cultivating plant to be finally obtained.

The amount of the internal cross-linking agents to be used is preferably in the range of 0.001-2 mol %, more preferably in the range of 0.005-0.5 mol %, still more preferably in the range of 0.01-0.2 mol %, and particularly preferably in the range of 0.03-0.15 mol % based on the amount of the aforementioned monomer (excluding the internal cross-linking agent). If the amount of the aforementioned internal cross-linking agents to be used falls short of 0.001 mol % or exceeds 2 mol %, the deviation will possibly prevent sufficient absorption properties from being acquired.

For the purpose of introducing the cross-linked structure into the polymer by using the internal cross-linking agent mentioned above, it suffices to add the internal cross-linking agent to the reaction system before, during, or after the polymerization of the aforementioned monomer or after the neutralization thereof.

(c) Polymerization Initiator

As the initiator for polymerization of the aforementioned unsaturated monomer to obtain the water absorbent resin for use in this invention, such radical polymerization initiators as potassium persulfate, ammonium persulfate, sodium persulfate, potassium peracetate, sodium peracetate, potassium percarbonate, sodium percarbonate, t-butyl hydroperoxide, hydrogen peroxide, and 2,2'-azobis(2-amidinopropane)dihydrochlorice and such photopolymerization initiators as 2-hydroxy-2-methyl-1-phenyl-propan-1-on are available. The amount of such a polymerization initiator is generally in the range of 0.001-2 mol % and preferably in the range of 0.01-0.1 mol % (based on the whole monomer) from the viewpoint of the properties. If the amount of the polymerization initiator falls short of 0.001 mol %, the shortage will result in unduly increasing the residual unaltered monomer. Conversely, if the amount exceeds 2 mol %, the overage will be at a disadvantage in rendering the control of polymerization difficult.

(d) Method of Polymerization

For the purpose of polymerizing the aforementioned monomer to obtain the water absorbent resin for use in this invention, it is permissible to adopt bulk polymerization or precipitation polymerization. From the viewpoint of the performance, the ease of control of polymerization, and the absorption characteristics of the swelled gel as well, it is commendable to adopt polymerization as aqueous solution, which resides in reducing the aforementioned monomer to an aqueous solution polymerization or reverse phase suspension polymerization.

The concentration of the monomer in the aqueous solution which is reduced from the monomer (hereinafter referred to as "aqueous solution of monomer") does not need to be particularly restricted but is decided depending on the temperature of the aqueous solution and the kind of monomer. It is preferably in the range of 10-80 wt. % and more preferably in the range of 20-60 wt. %. In performing the aqueous solution polymerization mentioned above, a solvent other than water may be additionally used when necessary. The solvent so used additionally does not need to be particularly discriminated on account of its kind.

The polymerization mentioned above is initiated by using the polymerization initiator described in the preceding paragraph (c). Optionally, such active energy rays as ultraviolet ray, electron ray, and γ ray may be used either singly or in the form of a mixture of two or more members in combination with the polymerization initiator mentioned above. Though the temperature during the initiation of polymerization depends on the kind of the polymerization initiator to be used, it is preferably in the range of 15-130° C. and more preferably in the range of 20-120° C. If the temperature during the initiation of the polymerization deviates from the range specified above, the deviation will be at a disadvantage in unduly increasing the residual monomer in the produced water absorbent resin or suffering the self-crosslinking reaction to proceed excessively possibly to the extent of degrading the water absorbing property of the water absorbent resin.

Incidentally, the term "reversed phase suspension polymerization" refers to a method of polymerization which consists in suspending the aqueous solution of: monomer in a hydrophobic organic solvent. It is described in such U.S. patents as U.S. Pat. No. 4,093,776, No. 4,367,323, No. 4,446, 261, No. 4,683,274, and No. 5,244,735. The aqueous solution polymerization is a method for polymerizing the aqueous solution of a monomer without using a dispersing solvent. It is described in such U.S. patents as U.S. Pat. No. 4,625,001, No. 4,873,299, No. 4,286,082, No. 4,973,632, No. 4,985,518, No. 5,124,416, No. 5,250,640, No. 5,264,495, No. 5,145,906, and No. 5,380,808 and such European Patents as European Patent No. 0811636, No. 0955086, and No. 0922717. The monomers and the initiators which are cited in these methods of polymerization are available for this invention.

The result of the polymerization is generally a hydrated gel-like cross-linked polymer. This invention can use this hydrated gel-like cross-linked polymer as the water absorbent resin (A) when the water content of the hydrated gel-like cross-linked polymer is in the range of 10-50 wt. %. This water absorbent resin is obtained, for example, by finely dividing a hydrated gel-like cross-linked polymer having a water content in the range of 10-50 wt. % with a meat chopper and then causing such an: inorganic compound as a calcium compound to be deposited on the surface of the finely divided polymer.

(e) Drying

Meanwhile, the hydrated gel-like cross-linked polymer may be dried as occasion demands and put to use generally as pulverized before and/or after the drying. When this drying is effected with hot air, it is performed at a temperature generally in the range of 60° C.-250° C., preferably in the range of 100° C.-220° C., and more preferably in the range of 120° C.-200° C. The drying time is selected, depending on the surface area and the water content of the polymer and the kind of a drying device so as to obtain a water content aimed at. The water content of the water absorbent resin which can be used for this invention (specified by the amount of water contained in the water absorbent resin or the water retaining material for cultivating plant and determined as the amount of loss in weight at the end of 3 hours' drying with hot air at 180° C.) does not need to be particularly restricted. The water absorbent resin ought to be in the form of a powder exhibiting fluidity even at room temperature from the viewpoint of the solid state properties of the water retaining material for cultivating plant and the ease of handling. Thus, the powder has a water content preferably in the range of 0-50 wt. %, more preferably in the range of 0-40 wt. %, still more preferably in the range of 0-30 wt. %, particularly preferably in the range of 0-20 wt. %, and most preferably in the rang of 0-10 wt. %. The preferred particle diameter of the water absorbent resin will be described specifically herein below.

When the polymerization is effected by the aforementioned method of reversed phase suspension polymerization, generally the hydrated gel-like cross-linked polymer obtained after the completion of the polymerization reaction may be azeotropically dehydrated in a state dispersed in an organic solvent of such hydrocarbon as hexane till the water content is adjusted in the range of 0-50 wt. %, preferably in the range of 0-30 wt. %, and more preferably in the range of 0-20 wt. %, then separated from the organic solvent by decantation or distillation, and dried by further another method as occasion demands. The method for effecting this drying does not need to be particularly restricted. Various methods such as heat drying, hot air drying, vacuum drying, infrared ray drying, microwave drying, dehydration by azeotropy with a hydrophobic organic solvent, and high humidity drying using hot steam which are capable of attaining the target water content are available for the drying.

(f) Organic Secondary Cross-Linking Treatment (Surface Cross-Linking Treatment)

The water absorbent resin to be used for the water retaining material for cultivating plant contemplated by this invention, after undergoing the cross-linking polymerization mentioned above, may be optionally dried and pulverized subsequently and further subjected to a surface cross-linking (secondary cross-linking) treatment. This surface cross-linking treatment is implemented properly to suit the necessity in due consideration of salt concentration of the soil to which the water retaining material for cultivating plant is applied, the behavior of the mineral species forming the soil, and the quality of the water used for irrigation, for example.

When the organic secondary cross-linking treatment is carried out with a covalent bond type cross-linking agent, while various cross-linking agents are available for this surface cross-linking, generally a polyhydric alcohol compound, an epoxy compound, a polyvalent amine compound or a condensate thereof with a haloepoxy compound, an oxazoline compound, a mono-, di- or poly-oxazolidinone compound, a polyvalent metal salt, or an alkylene carbonate compound is adopted from the viewpoint of the properties. The surface cross-linking agents which are usable for this invention are specifically cited in U.S. Pat. No. 6,228,930, No. 6,071,976, and No. 6,254,990, for example. As concrete examples of the surface cross-linking agents, such polyhydric alcohols as mono-, di-, tri-, tetra- or poly-ethylene glycol, monopropylene glycol, 1,3-propane diol, dipropylene glycol, 2,3,4-trimethyl-1,3-pentadiol, polypropylene glycol, glycerin, polyglycerin, 2-butene-1,4-diol, 1,4-butane diol, 1,3-butane diol, 1,5-pentane diol, 1,6-hexane diol, and 1,2-cyclohexane dimethanol; such epoxy compounds as ethylene glycol diglycidyl ether and glycidol; such polyvalent amine compounds as ethylene diamine, diethylene triamine, triethylene tetramine, tetraethylene pentamine, pentaethylene hexamine, polyethylene imine, and polyamide polyamine; such haloepoxy compounds as epichlorohydrin, epibromohydrin, and α-methyl epichlorohydrin; condensates of the polyvalent amine compounds mentioned above and the haloepoxy compounds mentioned above; such oxazolidienone compounds as 2-oxazolidinone; and such alkylene carbonate compounds as ethylene carbonate may be cited, though not exclusively. Among other cross-linking agents enumerated above, at least polyhydric alcohols prove particularly advantageous. The polyhydric alcohols having 2-10 carbon atoms, preferably 3-8 carbon atoms are preferably used.

The amount of the surface cross-linking agent to be used, though variable with the kinds of compounds to be used and the combination thereof, is preferably in the range of 0.001 weight part-10 weight parts and more preferably in the range of 0.01 weight part-5 weight parts based on 100 weight parts of water absorbent resin (the water absorbent resin in a state existing prior to the surface cross-linking). In this invention, the surface cross-linking is preferred to be performed by the use of water. In this case, the amount of the water to be used, though variable with the water content of the water absorbent resin (the water absorbent resin in a state existing prior to the surface cross-linking), falls generally in the range of 0.5-20 weight parts and preferably in the range of 0.5-10 weight parts, based on 100 weight parts of the water absorbent resin mentioned above. In this invention, a hydrophilic organic solvent may be used besides water. The amount of this hydrophilic organic solvent to be used is in the range of 0-10 weight parts, preferably in the range of 0-5 weight parts and more preferably in the range of 0-3 weight parts, based on 100 weight parts of the water absorbent resin prior to the surface cross-linking. Among other various methods of mixing which are available at all, the method which consists in preparatorily mixing the water and/or a hydrophilic organic solvent and subsequently causing the resultant aqueous solution to be sprayed onto or dropwise mixed with the water absorbent resin is preferably used. The method resorting to the action of spraying proves more advantageous. The average size of the liquid drops formed by the spraying is preferably not more than 300 μm (the lower limit 0.1 μm) and more preferably not more than 200 μm.

When the organic secondary cross-linking treatment is implemented by the polyion bonding cross-linking, the water absorbent resin may be coated with polyalkylene amine, modified polyamine, polyethylene imine, modified polyethylene imine, polyallyl amine, or polyvinyl amine, for example as disclosed in the specification of U.S. Pat. No. 5,382,610 and the JP-A 1994-370.

In the case of performing the surface cross-linking treatment, the mixing device to be used in mixing the water absorbent resin (the water absorbent resin in a state preceding the surface cross-linking) with the surface cross-linking agent mentioned above, water and the hydrophilic organic solvent is preferred to be furnished with a large mixing power in order to ensure homogeneous mixing infallibly. As concrete examples of the mixing device of this description which are favorably adopted herein, a cylindrical mixer, a double-wall conical mixer, a high-speed stirring mixer, a V-shaped mixer, a ribbon type mixer, a screw type mixer, a twin-arm type kneader, a pulverizing type kneader, a rotary mixer, an air current type mixer, a turburizer, a batch type Lödige (/Loedige/plausher) mixer, and a continuous type Lödige (/Loedige/plausher) mixer may be cited.

In the case of mixing the surface cross-linking agent, the water retaining material for cultivating plant contemplated by this invention may be obtained by either mixing this surface cross-linking agent with the polyvalent metal compound (B) prior to the surface cross-linking or allowing it to coexist with the polyvalent metal compound. The polyvalent metal compound will be specifically described below. Further in the case of mixing the surface cross-linking agent, the mixing system may allow coexistence of water-insoluble finely divided particles of silicon dioxide or a surfactant to such an extent as to avoid impairing the effect of this invention besides the polyvalent metal compound mentioned, above.

The water absorbent resin which has been mixed with the surface cross-linking agent is preferably subjected to a heating treatment. As regards the conditions for performing the heating treatment, the temperature of the water absorbing resin before surface cross-linking treatment or the temperature of the heat medium (especially temperature of heat medium) falls preferably in the range of 100-250° C. and more preferably in the range of 150-250° C. and the heating time falls preferably in the range of 1 minute to 2 hours. Preferred examples of the combination of temperature and time are 0.1-1.5 hours at 180° C. and 0.1-1 hour at 200° C. When the water absorbent resin is obtained by the reversed phase suspension polymerization, the water absorbent resin the surface of which has been given a cross-linking treatment can be obtained by causing the surface cross-linking agent to be dispersed in a hydrophobic organic solvent with the water absorbent resin having a water content of not more than 50 wt. %, preferably not more than 40 wt. %, and more preferably not more than 30 wt. % after completion of the polymerization and during the course of the azeotropic dehydration and/or after the azeotropic dehydration.

(g) Particle Diameter of Water Absorbent Resin

The particle diameter of the absorbent resin (A) to be used for the water retaining material for cultivating plant in this invention does not need to be restricted but may be properly selected to suit the purpose of use of the resin. The weight average particle diameter of water absorbent resin is provided according to a method described in Example. When the absorbent resin (A) is used as a water retaining material for cultivating plant, for example, the particles of a diameter of less than 150 μm account for a proportion falling preferably in the range of 0-20 wt. %, more preferably in the range of 0-10 wt. %, and particularly preferably in the range of 0-5 wt. %. If the particles of a diameter of not more than 150 μm account for a proportion exceeding 20 wt. %, the overage will possibly induce inhibition of plant growth because of an increase in the amount of the water-soluble component liquated from the water absorbent resin. Then, the particles of a diameter of not less than 600 μm account for a proportion of not less than 20 wt. %, preferably not less than 30 wt. %, and more preferably not less than 40 wt. %. Further, the weight average particle diameter of the water absorbent resin which is advantageously used falls in the range of 200-10,000 μm, preferably in the range of 500-5,000 μm, and particularly preferably in the range of 500-2,000 μm. If the weight average particle diameter exceeds 10,000 μm, the overage will possibly impair the ease of handling of the water absorbent resin for plant growth owing to a heavy decline of the water absorbing speed. If the weight average particle diameter falls short of 200 μm, the shortage will be at a disadvantage in rendering the particles easy to dry owing to a large surface area of the particles in the state of a water absorbing gel and suffering the water component in the particles to transpire more rapidly than the water is supplied to the plant. Incidentally, the weight average particle diameter is determined by the method which is described in a working example cited herein below.

The particle diameter described above is applicable also to the water retaining material for cultivating plant. The particle diameter of the water absorbent resin or the water retaining material for cultivating plant, depending on the purpose of use or as occasion demands, may be adjusted by having the resin further granulated as mixed with insoluble finely divided particles or a hydrophilic solvent or preferably water.

The water retaining material for cultivating plant of this invention will be specifically described herein below. It is produced by adding the polyvalent metal salt (B) to the water absorbent resin (A) which is obtained as described above.

(2) Polyvalent Metal Compound (B)

The polyvalent metal compound (B) which is used in this invention is a salt or a hydroxide of a polyvalent metal, embracing such inorganic normal salts and double salts as halogenides, nitrates, sulfates, and carbonates of such divalent metals as calcium, magnesium, barium, and alkaline earth metals, such trivalent metals as aluminum, and such transition metals as zinc, iron, manganese, copper, and molybdenum, organic salts of lactic acid and fatty acid, and hydroxides, and oxides. For the sake of giving a good environment to the stability of the state of gel after absorption of water and to the physiological action on the plant such as germination and growth of a plant, the polyvalent metal compound is a compound containing at least one element selected from the group consisting of calcium, magnesium, iron, and silicon or a mixture of such compounds. Since calcium is an essential component (main component) for the ability of a plant to induce, growth of root hair, the inorganic compound mentioned above is preferred to contain calcium essentially. Thus, the inorganic compound is enabled to manifest the ability to effect gradual release of calcium. The polyvalent metal compound (B) may be a composition resulting from combining two or more polyvalent metal compounds containing one of the elements enumerated above like a composition of calcium oxide and silicon oxide or one polyvalent metal compound containing two or more members selected from the group of the elements enumerated above like calcium ferrite or magnesium calcium potassium sulfate. When the water absorbent resin is made to contain at least one of the elements enumerated above together with calcium, it is enabled, when used particularly for the growth of a plant, to excel in the rhizogenesis ratio and the germination ratio.

The polyvalent metal compound (B) is preferred to be scantly soluble in water. The solubility of this compound in 100 g of deionized water at 20° C. under ordinary pressure is more than 0 and not more than 10.0 g and falls preferably in the range of 0.001-10.0 g, more preferably in the range of 0.001-5.0 g, still more preferably in the range of 0.005-1.0 g, yet more preferably in the range of 0.005-0.5 g, and particularly preferably in the range of 0.005-0.3 g. If the solubility mentioned above exceeds 10.0 g, the overage will result in rendering the polyvalent metal element ion, particularly the metal ion of a valency of not less than 2, easy to permeate the interior of the water absorbent resin and compelling the carboxyl group in the water absorbent resin particles to induce cross-linkage of metal and consequently degrading the absorption capacity. If the solubility of the polyvalent metal ion which could constitute a nutrient salt for plant growth is unduly high, the overage will be at a disadvantage in impairing the lasting supply of the nutrient salt to the plant during the actual use of the resin because the ion is suddenly released and diffused when the resin is exposed to the water from rain or from a sprinkler. The polyvalent metal compound which is insoluble in water is not favorable because the plant cannot utilize the inorganic element.

As concrete examples of the compounds which form the polyvalent metal compound (B), the inorganic normal salts and double salts as sulfates and carbonates of at least one element selected from the group consisting of calcium, magnesium, iron, and silicon, organic salts of lactic acid and fatty acid, and hydroxides and oxides may be cited. Among other polyvalent metal compounds enumerated above, such inorganic normal salts and double salts as sulfates and carbonates, organic salts of lactic acid, organic acid, and fatty acid, and hydroxides and oxides prove particularly favorable from the viewpoint of the water absorption characteristics (absorption capacity and water absorbing speed, for example) as the water absorbing material for a plant growth and the stability of the state of the water absorbing gel, and the physiological actions such as germination and growth of a plant which are manifested on the plant. As concrete examples of the polyvalent metal compound (B), inorganic compounds including such calcium compounds as calcium sulfate, calcium hydroxide, calcium oxide, calcium carbonate, calcium borate, calcium lactate, calcium citrate, and calcium stearate, such magnesium compounds as magnesium oxide, magnesium hydroxide, magnesium lactate, and magnesium citrate, and iron oxide and silicon oxide which have solubilities in the range specified above may be cited. More specifically, the mixtures of such calcium compounds as calcium sulfate, calcium hydroxide, calcium oxide, calcium carbonate, calcium borate, calcium lactate, calcium citrate, and calcium stearate with any member of the group consisting of magnesium oxide, magnesium hydroxide, magnesium lactate, magnesium citrate, and iron oxide may be cited. Incidentally, the inclusion of calcium is essentially required as described above and the polyvalent metal compound (B) is required to contain a calcium compound in a proportion of not less than 5 wt. %. For the purpose of increasing the growth of leaves other than roots and the yield of fruits, this proportion falls preferably in the range of 5-100 wt. % and preferably in the range of 10-100 wt. %, more preferably in the range of 10-95 wt. %. The compound of at least one element selected from the group consisting of magnesium, iron, and silicon is contained in the polyvalent metal compound (B) in a proportion falling preferably in the range of 5-95 wt. % and more preferably in the range of 10-90 wt. %.

As the polyvalent metal compound (B) of the foregoing description, this invention may use the ash emanating from an incinerator. The elements contained in the ash from an incinerator vary with the raw material prior to incineration. Fly ash, super ash, clinker ash, and cinder ash are concrete examples of the polyvalent metal compound which essentially contains the calcium compound mentioned above and also contains a magnesium compound, an iron compound, and a silicon compound. Incidentally, the fly ash is a coal ash collected in a dust collector from the combustion gas of a boiler burning finely divided coal, the cinder ash is a coal ash collected when the combustion gas of a boiler burning finely divided coal falls down an air preheater and a coal economizer during the course of passage therethrough, and the clinker ash is a coal ash collected from the furnace bottom of a boiler burning finely divided coal. The super ash is produced by pulverizing the ash arising in the incineration of sludge till minute particles of a uniform size are obtained. These incineration ashes are only required to contain not less than two elements selected from the aforementioned group consisting of calcium, magnesium, iron, and silicon. The fly ash and the super ash can be advantageously used in respect that they contain calcium and magnesium in large proportions. As regards the solubility of the incineration ash which is used as the polyvalent metal compound (B), the individual solubilities of the aforementioned elements contained in the incineration ash are required to fulfill the condition that the solubility in 100 g of deionized water at 20° C. is more than 0 and not more than 10.0 g. Though the fly ash, for example, has been hitherto used copiously in building boards, bridges for expressways, bridges for high-level roads, foundations for iron bridges, drainage works, watertight structures, mortar works, and carpet linings, it has never been used as a plant growth grade water absorbing material in combination with a water absorbent resin of a high absorption capacity. However, this invention, by using the incineration ash of this quality as the polyvalent metal compound (B), is enabled to utilize a waste material to a high degree. Incidentally, the incineration ash may be used in addition to a still other polyvalent metal compound. Thus, for the sake of increasing the amount of calcium, the mixture of fly ash with the aforementioned calcium compound such as calcium carbonate, calcium nitrate, or calcium hydroxide may be used. The polyvalent metal compound (B) regards as a polyvalent metal compound even if the counter ion thereof is changed by reacting it with the absorbent resin (A).

Among other concrete examples of the polyvalent metal compound (B) enumerated above, calcium nitrate, calcium sulfate, calcium hydroxide, calcium oxide, and calcium carbonate prove most favorable from the viewpoint of the adhesiveness to the surface of the water absorbent resin particles, the plant growth characteristics, the characteristics of gradual release of calcium, the water absorbing property, and economical property.

The polyvalent metal compound (B) generally is in the form of powder containing crystal water having a water content of not, more than 10 wt. % and does not particularly impose any restriction on the particle diameter thereof. Generally, it has a smaller weight (mass) and a smaller average particle diameter than the ordinary water absorbent resin, it is used in the range of 0.001-150 μm, preferably 0.1-75 μm. The method for adding the polyvalent metal compound (B) and the amount thereof to be added will be specifically described afterward in Paragraph (3) titled "water retaining material for cultivating plant."

(3) Water Retaining Material for Cultivating Plant
(Water Retaining Agent for Cultivating Plant)

The water retaining material for cultivating plant contemplated by this invention comprises a water absorbent resin and a polyvalent metal compound and preferably has at least part of the water absorbent resin and the polyvalent metal compound substantially unified. Particularly, it is preferred to have the polyvalent metal compound unified on the surface or in the neighborhood of the surface layer of the water absorbent resin. The term "unification" as used herein refers to the form in which at least part of the polyvalent metal compound is chemically or physically combined with the water absorbent resin. As concrete examples of the mode of this unification, the polyvalent metal compound chemically bound to the functional group present in the water absorbent resin, the polyvalent metal compound physically deposited on the surface of the water absorbent resin, and the polyvalent metal compound lodged by permeation on the surface of the water absorbent resin may be cited.

The water absorbent resin, as described above, is generally possessed of such a monovalent salt of carboxylic acid as sodium carboxylate. The monovalent salt of carboxylic acid is possessed of the characteristic property of absorbing a polyvalent metal ion which is a nutrient salt necessary for a plant such as calcium ion necessary for germination, rhizogenesis, and growth of plant. This phenomenon is particularly conspicuous when the content of the carboxyl group (salt) exceeds 3 mmols/g. In the situation in which the water absorbent resin excelling in the water absorbing characteristic directly contacts the plant, therefore, it has been difficult to use the water absorbent resin in the soil having a water absorbent resin content of not less than 1 wt. %, particularly not less than 5 wt. %, for the purpose of exalting the efficiency of irrigation. When the water absorbent resin and the polyvalent metal compound are present as integrated on the surface or in the neighborhood of the surface layer of the water absorbent resin as in the case of this invention, however, the inhibition of the growth of the plant can be prevented because the monovalent salt of carboxylic acid present on the surface of the water absorbent resin is incapable of depriving the plant of such a polyvalent metal ion as calcium ion. Thus, the amount of the water retaining material for cultivating plant to be used in the soil can be increased to such a high concentration as not less than 1 wt. %, particularly not less than 5 wt. %, with the result that the effect of irrigation will be greatly exalted. Incidentally, if the polyvalent metal compound and the water absorbent resin are separately administered, their effects will be at a disadvantage in suffering the monovalent salt of carboxylic acid present on the surface of the water absorbent resin particles to induce manifestation of the effect of inhibiting the plant growth mentioned above.

This invention, for the sake of securing the action of promoting the plant growth and the water absorbing property as the water retaining material, prefers the aforementioned polyvalent metal compound to be deposited in the form of adhering to and/or coating the surface of the water absorbent resin mentioned above. Incidentally, the expression "the surface of the water absorbent resin" as used in this invention refers to the concept of embracing at least part of the outermost surface of the water absorbent resin. Namely, it designates the outermost surface and the shell layer formed over a distance falling generally in the range of 0-20%, preferably in the range of 0-10%, more preferably in the range of 0-5%, and particularly preferably in the range of 0-1% in the direction from the outermost surface to the center relative to the diameter of the particle. In the average particles of the water retaining material for cultivating plant, the expression designates the shell layer formed over a distance falling generally in the range of 0-50 μm, preferably in the range of 0-20 μm, more preferably in the range of 0-5 μm, and particularly preferably in the range of 0-1 μm as reckoned from the outermost surface and the outermost surface. Thus, the form having the polyvalent metal compound coat the outermost surface of the water absorbent resin and the form having the polyvalent metal compound deposited only on the surface and/or the surface layer of the water absorbent resin are preferred examples. Particularly, the mode which has the polyvalent metal ion of a polyvalent metal compound substituted on the surface and in the neighborhood of the surface layer of the water absorbent resin through salt exchange of the carboxyl group (salt) present in the surface layer part of the water absorbent resin and the polyvalent metal ion is embraced. Thus, the distribution of the inorganic compound in the water retaining material for cultivating plant occurs in the form in which the proportion of the distribution of the inorganic compound increases toward the outermost surface in the direction of the center from the outermost surface, decreases toward the center, and nearly ceases to exist in the neighborhood of the center. When the polyvalent metal compound possessing sparing solubility in water is present on the surface and in the neighborhood of the water retaining material for cultivating plant, since such inorganic compounds of calcium and magnesium as constitute nutrient salts for plant are gradually released into the soil, these inorganic compounds can be supplied efficiently to the plant without inducing salt damage. When the polyvalent metal compound permeates the interior of the water absorbent resin particles, it induces the ion cross-linkage due to the substitution of the monovalent salts of carboxylic acid (such as the sodium of carboxylic acid and the potassium of carboxylic acid) in the water absorbent resin for the polyvalent metal ion forming the inorganic compound and consequently degrades the saturated absorption capacity and the water absorbing speed greatly. By using a polyvalent metal compound possessing a specific solubility and causing the polyvalent metal compound to exist on the surface or in the neighborhood of the surface layer of the water absorbent resin, however, it is made possible to prevent the water absorbing characteristic from being degraded by the ion cross-linkage and consequently afford a water retaining material for cultivating plant possessing high water absorbing characteristic.

Incidentally, the distribution of inorganic elements contained in the water retaining material for cultivating plant can be analyzed and confirmed by means of an electron ray probing microanalyzer (EPMA), for example. By polishing the surface of the water retaining material for cultivating plant with a homogenizer, for example, it is made possible to analyze the surface layer and the interior of particles for inorganic element concentration and distribution.

The content of the polyvalent metal compound usually falls in the range of 5-50 wt. %, preferably 7-50 wt. %, more preferably in the range of 9-50 wt. %, next preferably 10-50 wt. %, more preferably in the range of 10-45 wt. %, still more preferably in the range of 15-45 wt. %, particularly preferably in the range of 15-40 wt. %, and most preferably in the range of 15-30 wt. %. If this content falls short of 5 wt. %, the shortage will result in lowering the effect of allaying the action of inhibiting the plant growth. Conversely, if this content exceeds 50 wt. %, the overage will possibly induce degradation of the water absorbing capacity as the water retaining material for cultivating plant. Then, the water retaining material for cultivating plant of this invention prefers the presence on the surface of the water absorbent resin (A) of the aforementioned polyvalent metal compound (B) in an amount in the range of 7-50 wt. %, preferably in the range of 10-40 wt. %, and particularly preferably in the range of 20-40 wt. % based on the amount of the particulate water retaining material for cultivating plant. The presence of the aforementioned polyvalent metal compound (B) in the range specified above on the surface is at an advantage in repressing the seizure of calcium ion from plant and enabling the ability to release gradually calcium to be manifested easily. When the amount of the polyvalent metal compound based on the weight of the water retaining material for cultivating plant, it is measured after a volatile component contained in the material such as water is removed through dry and removal treatment under reduced pressure (less than 1 mmHg) at 60±5° C. for 24 hrs in advance prior to their determinations.

The particle diameter of the water retaining material for cultivating plant is properly selected to suit the purpose of use. For the sake of using the water retaining member for cultivating plant as such, the particles thereof having diameters fall short of 150 μm account for a proportion falling preferably in the range of 0-20 wt. %, more preferably in the range of 0-10 wt. %, and particularly preferably in the range of 0-5 wt. %. If this proportion exceeds 20 wt. %, the overall will possibly result in inducing inhibition of the plant growth because of an increase in the amount of the water-soluble component liquated from the water absorbent resin. Then, the particles of the material having diameters exceed 600 μm account for a proportion of not less than 20 wt. %, preferably not less than 30 wt. %, and more preferably not less than 40 wt. %. The weight average particle diameter of the water retaining material for cultivating plant which is advantageously used falls in the range of 200-10,000 μm, preferably in the range of 500-5,000 μm, and particularly preferably in the range of 500-2,000 μm. If the weight average particle diameter exceeds 10,000 μm, the overage will possibly result in degrading the ease of handling of the water retaining material directed toward the plant growth. If the weight average particle diameter particularly falls short of 200 μm, the shortage will be at a disadvantage in suffering the water component to transpire faster than the water is supplied to the plant because the material in the state of water absorbing gel tend to dry because of a large surface area.

The water absorbing speed of the water retaining material for cultivating plant (the absorption capacity in deionized water during a period of 10 minutes) which is defined by a method described in a working example cited herein below falls generally in the range of 20-500 g/g, preferably on account of the balance with the economy or production cost in the range of 30-500 g/g, more preferably in the range of 50-500 g/g, particularly preferably in the range of 70-500 g/g, and most preferably in the range of 100-500 g/g, i.e. a hitherto unattainable magnitude. If the water absorbing speed falls short of 20 g/g, the shortage will possibly result in inducing diffusion and effusion of water from the soil when the plant is irrigated by spraying water on the soil, preventing the retained water from reaching the amount aimed at, and heightening the frequency of irrigation and consequently impairing the efficiency of operation. Conversely, if this speed exceeds 500 g/g, the overage will possibly result in disrupting the economy in terms of the cost of production.

The particulate water retaining material for cultivating plant of this invention has a calcium gradual release index of more than 0 and not more than 50 mg/L. This index falls preferably in the range of 1.0-20 mg/L, more preferably in the range of 1.5-15 mg/L, and particularly preferably in the range of 2.0-15 mg/L. If this index exceeds 50 mg/L, the overage will possibly result in inducing metal cross-linkage with the carboxyl group in the water absorbent resin particles and consequently lowering the absorption capacity and rendering lasting diffusion of calcium difficult to attain.

Then, the saturated absorption capacity of the water retaining material for cultivating plant of this invention is in the range of 20-1,000 g/g, preferably in the range of 50-1,000 g/g, and more preferably in the range of 100-1,000 g/g.

In this invention, the amount of the water-soluble component of the water retaining material for cultivating plant (the amount of the soluble component/amount of the extracted soluble component) is preferably in the range of 0-20 wt. %, more preferably 0-15 wt. %, next preferably in the range of 0-10 wt. %, furthermore preferably in the range of 0-7 wt. %, particularly preferably in the range of 0-5 wt. %, and most preferably in the range of 0-3 wt. %. If the amount of the soluble component exceeds the range specified above, the overage will be at a disadvantage in inducing inhibition of the plant growth because the uncrosslinked water-soluble polymer (such as polyacrylic acid (salt), for example) mainly forming the soluble component is liquated into the living environment of the plant. The amount of the soluble component liquated (the liquated soluble substance) from the water retaining material for cultivating plant of this invention when this material has been left standing at a specific saturated absorption capacity, specifically when the material has been reduced to a deionized water absorbing gel and kept at 25° C. for 24 hours in the swelled state of 20 g/g, the swelled state of 30 g/g, the swelled state of 50 g/g, the swelled state of 70 g/g, and the swelled state of 100 g/g respectively in terms of the saturated absorption capacity is preferred to be as small as possible. This amount falls in the range of 0-0.5 wt. %, preferably in the range of 0-0.3 wt. %, more preferably in the range of 0-0.1 wt. %, and most preferably in the range of 0-0.005 wt. %.

Further, the water retaining material for cultivating plant contemplated by this invention is characterized by decreasing the angle of repose and excelling in the fluidity of powder because it manifests low adhesiveness even in the dry state having a water content in the range of 0-20 wt. % and possesses a small internal friction coefficient or internal friction angle. The internal friction coefficient and the internal friction angle in the powder characteristics mentioned above can be determined by the disintegrating test performed on the powder layer. The devices available for performing the disintegrating test of a powdery material include disintegrating box type devices, ring disintegrating devices, and parallel planar type devices represented by Jenike Shear Cell. It also exhibits a characteristic property of excelling in fluidity in the humidified state (hereinafter referred to simply as "hygroscopic fluidity"). The hygroscopic fluidity designates the fluidity of a powder manifested as in the phenomenon of blocking or caking when the sample has been left standing at 25° C. and a relative humidity of 90% RH. The water retaining material for cultivating plant of this invention is characterized by exhibiting excellent hygroscopic fluidity such that neither blocking nor caking occurs while the water content of the material falls generally in the range of 10-30 wt. % and particularly in the range of 15-30 wt. %. Owing to the excellence in the fluidity as a powder, the material is characterized by excelling in the efficiency of conveyance during the course of production and in the scattering property during the course of actual use. The hygroscopic fluidity (Anti-caking property/Anti-blocking property) of the water retaining material for cultivating plant of this invention falls in the range of 0-10 wt. %, preferably in the range of 0-5 wt. %, and more preferably in the range of 0-2 wt. %. Incidentally, the hygroscopic fluidity and the water content mentioned above are the magnitudes determined by the method which will be described in the working example cited herein below.

(4). Use

The water retaining material for cultivating plant of this invention can be advantageously used as a water retaining material particularly for the plant growth because the seeds sown on the material reduced to a gel in advance by supply of water (irrigation) exhibit excellent germination ratio and rhizogenesis ratio. The water retaining material for cultivating plant of this quality deserves to be called a substitute soil and can secure excellent germination ratio and rhizogenesis ratio without requiring simultaneous use of other plant growth grade carrier. Moreover, this water retaining material for cultivating plant excels in the efficiency of water retention as evinced by the fact that it allows a plant to take roots therein.

The water retaining material for cultivating plant of this invention, as occasion demands, may further contain deodorant, anti-fungus agent, repellent to harmful insects and animals, agricultural pesticides (insecticide, fungicide, and herbicide), plant activator, plant life prolonging agent, plant hormone, mineral, pigment, dye, thickening agent, tackifier, salts, and pH adjusting agent, Kaolin, Clay, Soil, in an amount in the range of 0-30 wt. %, preferably 0-1.0 wt. %, more preferably 0-1 wt. %.

Particularly as concrete examples of the plant hormone, auxins such as 2,4-dichlorophenoxy acetic acid, naphthalene acetic acid, and indol acetic acid which promote germination and formation of callus and cytokinins such as kinetin, zeatin, impentenil adenine, and benzyl adenine which promotes differentiation of buds may be cited. Besides, giberellin which promotes growth of stems and leaf sheaths, abscisin which possesses an action of adjusting growth balance, and ethylene which promotes efflorescence and maturation of fruits may be cited as other examples. The hormones which are necessary differ with the kinds of plants. These plant hormones may be used either singly or in the form of a mixture of two or more members. It is particularly favorable to have the water retaining material for cultivating plant contain such substances as lactic acid, acetic acid, and wood vinegar which exhibit an anti-fungus action and an anti-fungus agent. The amount of such additives to be used falls in the range of 0-10 weight parts, preferably in the range of 0-5 weight parts, and more preferably in the range of 0-1 weight part based on the weight of the water retaining material for cultivating plant.

The water retaining material for cultivating plant of this invention may be used as mixed with soil and other plant growth grade carrier. As concrete examples of the plant growth grade carrier which can be used for this mixture, such porous inorganic materials as soil, gravel, pumice, carbide, peat, sponge, vermiculite, bark, pearlite, zeolite, firuton, porous ceramic, and kuntan, foamed synthetic resins such as lock wool, sponge, bog moss, coconut shell, cryptomoss, polystyrene, and polyurethane, and crushings thereof, and pulp may be cited. These plant growth grade carriers may be used either singly or in the form of a mixture of two or more members. The ratio of incorporation of the water retaining material for cultivating plant may be arbitrarily set or may be properly selected to suit the kind of a plant to be grown, the condition of growth of the plant, and the method for using the water retaining material for cultivating plant. The amount of the water retaining material for cultivating plant to be incorporated in this case is in the range of 1-30 wt. %, preferably in the range of 1-20 wt. %, next preferably in the range of 2-15 wt. %, particularly preferably in the range of 3-10 wt. %, and most preferably in the range of 3-7 wt. % based on the amount of the soil and other plant growth grade carrier. If this amount falls short of 1 wt. %, the shortage will result in preventing the water retaining effect from being sufficiently manifested. Conversely, if this amount exceeds 30 wt. %, the overage will possibly result in degrading the strength of soil and ground and decreasing the volume of the soil when it is dried.

The plant growth grade material contemplated by this invention manifests no growth inhibition but promote plant growth, therefore, can be used solely for the purpose of growing a plant. Thus, it does not need to use soil or other plant growth grade carrier. It is a surprising effect by the plant growth grade material of this invention comparing with the former acrylic acid type absorbent resin, because the former resin was not able to use solely to grow a plant. Accordingly, the plant growth grade material by this invention able to use for interior such as a propagation by cutting and hydro culture.

The method for using the water retaining material for cultivating plant of this invention does not need to be particularly restricted. The method which consists in scattering this material in fields, of rice and other crops and the method which consists in reducing this material to a gel and using the gel as a water retaining material as in the seed bed, for example are generally employed. Further, the material may be used as mixed with artificial ground and soil for tree planting on desert, dry lands such as dune, central median strip in a road, side lane, tree-lined street, indoor decoration, and building loof. It may be also used as contained in a formed young plant and transplanted together with the plant. It can be used for germinating seed, raising seedling, growing green vegetables, fruits and vegetables, root crops, and flowers, and transplanting grown trees, for example.

(5) Method for Production of Water Retaining Material for Cultivating Plant

The water retaining material for cultivating plant of this invention comprises (A) a water absorbent resin and (B) a polyvalent metal compound. It can be produced by the following method.

(a-1) A method for the production which comprises a step of mixing (A) said water absorbent resin in a state having a water content in the range of 0-50 wt. % and (B) said polyvalent metal compound in the range of 10-50 wt. % based on the weight of the solid component of (A) said water absorbent resin in a form of solution or a slurry.

(a-2) A method of production which comprises a step of mixing (A) said water absorbent resin in the state of a powder having a water content in the range of 0-20 wt. %, preferably 0-10 wt. % and (B) said polyvalent metal compound in the state of a powder and subsequently adding the resultant mixture and an aqueous liquid or steam together and mixing them.

(a-3) A method of production which comprises a step of mixing (A) said water absorbent resin having a water content in the range of 50-20 wt. % and (B) said polyvalent metal compound in the form of a solution, a slurry or a powder containing said polyvalent metal compound at a concentration of not less than 50 wt. %.

The production may be effected by other method than the methods of production of (a-1) through (a-3) mentioned above, such as, for example, by the dry blend method which comprises adding (A) the water absorbent resin having a water content of not more than 20 wt. % and (B) the polyvalent metal compound, both in the form of a powder, together and mixing them. Since (B) the polyvalent metal compound (B) is preferred to be deposited on, to adhere to, or to coat the surface of (A) the water absorbent resin, however, the methods of production of (a-1) through (a-3) mentioned above prove more favorable than the dry blend method. According to occasion demands, the polyvalent metal compound may be added to an aqueous solution such as mixture solution, water etc.

If (B) the polyvalent metal compound in the state of a solution or a slurry is mixed with (A) the water absorbent resin in the state having a water content exceeding 50 wt. %, this mixture will be at a disadvantage in greatly lowering the water absorbing characteristic of the water retaining material for cultivating plant because the polyvalent metal: compound permeates (A) the water absorbent resin to the interior thereof and the interior of the water absorbent resin is salt cross-linked by the polyvalent metal compound. Otherwise, if (B) the polyvalent metal compound is added to the monomer while the water absorbent resin is being polymerized, this addition will be at a disadvantage in suffering the interior of (A) the water absorbent resin to be salt cross-linked by (B) the polyvalent metal compound.

When the water retaining material for cultivating plant to be used in this invention is produced by the method of (a-1) mentioned above, the water content of (A) the water absorbent resin is preferred to be low for the purpose of preventing the polyvalent metal compound from permeating the water absorbent resin to the interior thereof. This water content falls preferably in the range of 0-50 wt. %, next preferably in the range of 0-40 wt. %, more preferably in the range of 0-35 wt. %, still more preferably in the range of 0-30 wt. %, particularly preferably in the range of 0-20 wt. %, and most preferably in the range of 0-10 wt. %.

Generally (B) the polyvalent metal compound is added in the form of a solution or a slurry. Like many polyvalent metal compounds which have low degrees of solubility in water, however, it is mixed with such a solvent as aqueous liquid and mixed in the form of a slurry to (A) the water absorbent resin.

The polyvalent metal compound concentration in the slurry is preferred to be not less than 50 wt. % and less than 100 wt. %, preferably in the range of 50-95 wt. %, more preferably 50-90 wt. %, most preferably in the range of 50-80 wt. %. The concentration of polyvalent metal compound (B) such as calcium sulfate dihydrate is calculated as a metal compound excluding the weight of hydrate thereof. For example, the concentration of a calcium sulfate dihydrate is calculated as a calcium sulfate excluding dihydrate. If this concentration exceeds 90 wt. %, the overage will be at a disadvantage in rendering uniform addition difficult because the slurry is deprived of fluidity and reduced to the state of hygroscopic powder. The amount of the slurry to be added is not particularly restricted by the kind of the polyvalent metal compound, for example. When the slurry uses an aqueous liquid as a solvent and it is added in a large amount, (A) the water absorbent resin mentioned above is suffered to acquire a high water concentration. The amount of the slurry to be added, therefore, is preferably less than 50 wt. %, more preferably exceeding 0 and not more than 40 wt. %, still more preferably exceeding 0 and not more than 30 wt. %, most preferably exceeding 0 and not more than 20 wt. %, especially preferably exceeding 0 and not more than 10 wt. %, very most preferably exceeding 0 and not more than 5 wt. % based on the solid component of (A) the water absorbent resin.

Then, the solvent to be used in the slurry containing (B) the polyvalent metal compound mentioned above does not need to be particularly restricted but is only required to disperse the polyvalent metal compound uniformly. For the purpose of allowing (B) the polyvalent metal compound to be deposited on or to adhere to the surface of (A) the water absorbent resin mentioned above, however, the solvent is preferred to be a polar solvent and more preferably to be water. As regards the solvent to be used for the slurry mentioned above, the surface cross-linking agent for (f) the surface cross-linking treatment of (1) the water absorbent resin, insoluble particles, a hydrophilic solvent, and an emulsifier may be added. Further, for the purpose of adjusting the fluidity of the slurry, an organic or inorganic dispersant (detergent, water-soluble polymer) may be added. This invention prefers a method which comprises spraying the slurry on the water absorbent resin or dropwise mixing them to various methods of mixing which are available. Further, depending on the particular kind of (B) the polyvalent metal compound, the slurry may be properly heated or cooled in consideration of the temperature, the solubility of the polyvalent metal compound in water, and the slurry concentration and the slurry fluidity relative to the temperature. Though the heating is generally continued past the solidifying point and up to the boiling point, it is, preferred to proceed at a temperature in the range of 20-80° C.

When the water retaining material for cultivating plant to be used in this invention is produced by the method of (a-2) mentioned above, the production is effected by adding a powder of (B) the polyvalent metal compound to (A) the water absorbent resin in the state of powder having a water content in the range of 0-20 wt. % and preferably in the range of 0-10 wt. % and mixing them and thereafter adding an aqueous liquid or steam to the resultant mixture and mixing them. When the aqueous liquid is selected for this addition, the aqueous liquid described in (a-1) mentioned above is used. The amount of this aqueous liquid to be used is so adjusted that the water content of the finally obtained water retaining agent for cultivating plant falls preferably in the range of 0-30 wt. %, more preferably in the range of 0-20 wt. %, still more preferably in the range of 0-15 wt. %, particularly preferably in the range of 0-10 wt. %, more particularly preferably in the range of 0-5 wt. %. When steam is selected for the addition, the amount of steam to be added is preferably adjusted so that the water content of the finally obtained water retaining agent for cultivating plant falls in the range of 0-30 wt. %.

When the water retaining material for cultivating plant to be used in this invention is produced by the method of (a-3) mentioned above, it is advantageous to mix a solution, or slurry or a powder containing (B) the polyvalent metal compound at a concentration of not less than 50 wt. % with (A) the water absorbent resin in the state having a water content in the range of 50-20 wt. %. When the powder is selected for the mixture, this mixture is at an advantage in preventing the polyvalent metal compound from permeating the water absorbent resin particles to the interior thereof and enabling a calcium compound effectively to adhere to, form a coat on, or produce a deposit on the surface or in the neighborhood of the surface. Incidentally, the water content of (A) the water absorbent resin is preferably in the range of 40-20 wt. %. If the water content of the water absorbent resin exceeds 50 wt. %, the overage will result in suffering the water absorbing characteristic to be degraded by the salt cross-linkage with a polyvalent metal inside (A) the water absorbent resin. If the water content falls short of 20 wt. %, the shortage will be at a disadvantage in preventing the polyvalent metal compound from being deposited or fastened to the surface of (A) the water absorbent resin mentioned above. The amount of the slurry to be added is not particularly restricted by the kind of the polyvalent metal compound, for example. When the slurry uses an aqueous liquid as a solvent and it is added in a large amount, (A) the water absorbent resin mentioned above is suffered to acquire a high water concentration. The amount of the slurry to be added, therefore, is, preferably less than 50 wt. %, more preferably exceeding 0 and not more than 40 wt. %, still more preferably exceeding 0 and not more than 30 wt. %, most preferably exceeding 0 and not more than 20 wt. %, especially preferably exceeding 0 and not more than 10 wt. %, very most preferably exceeding 0 and not more than 5 wt. % based on the solid component of (A) the water absorbent resin. It is the water retaining material for cultivating plant that has been hitherto described, and (A) the particulate water absorbent resin, (B) the polyvalent metal compound, and the concentration of (B) the polyvalent metal compound contained in the water retaining material for cultivating plant are identical to those described in the first and second aspects of this invention.

Incidentally, the mixing device which is used in (a-1)-(a-3) mentioned above is preferred to be endowed with a large mixing power for the purpose of mixing the two components uniformly and infallibly. As the mixing device mentioned above, (f) the mixing device of (2) the water absorbent resin mentioned above is suitable. The temperature at the time of mixing (A) the water absorbent resin and (B) the polyvalent metal compound does not need to be particularly restricted but is only required to be such that (B) the polyvalent metal compound can be deposited and adhered to the surface of (A) the water absorbent resin. The temperature of (A) the water absorbent resin preferably not less than 30° C. and more preferably falls in the range of 40-80° C. because of easy mixability.

EXAMPLES

Now, this invention will be described specifically below with reference to working examples. These working examples, however, are not meant to limit this invention in any way. The word "parts" means "parts by weight" unless otherwise specified.

(Method of Determination)

The properties of the water absorbent resin and the water retaining material for cultivating plant have been determined by the following methods. The methods will be described herein below with respect to the water absorbent resin. The characteristic properties of the water retaining material for cultivating plant s produced in the individual working examples and comparative examples may be determined similarly by using the individual water retaining material for cultivating plants in the place of the relevant water absorbent resins.

While the water absorbent resins or the water retaining material for cultivating plant s used for the determinations may be subjected in their original states to the determinations, the samples for the following test items (1), (2), (5), (7), and (9) may be dried in advance at 60±5° C. under a reduced pressure (less than 1 mmHg (133.3 Pa)) for 24 hrs prior to their determinations.

(1) Saturated Absorption Capacity

A sample, 0.02 g of powder, of the water absorbent resin was uniformly placed in a pouch (60 mm×80 mm) made of non-woven fabric and immersed in 500 ml of deionized water (electric conductivity not more than 5 μS/cm) adjusted to 25° C. The pouch was pulled up after 24 hours' standing in the deionized water, drained at 250 G for 3 minutes with a centrifugal separator, and then weighed to find the weight, $W_2$ (g). The same procedure was performed without using the powder of water absorbent resin to find the weight, $W_1$ (g), of the empty sample. The saturated absorption capacity (g/g) of the sample was calculated in accordance with the following formula using these weights, $W_1$ and $W_2$.

$$\text{Saturated absorption capacity (g/g)}=(W_2(g)-W_1(g))/\text{weight of water absorbent resin (0.02 g)}$$

(2) Water Absorbing Speed (Absorption Capacity in Deionized Water for 10 Minutes)

In a measuring cell having a 400 mesh (aperture 38 μm) of stainless steel fused to the bottom of a plastic supporting cylinder 60 mm in inside diameter, a sample, 1.0 g, of the water absorbent resin was thrown in uniformly in thickness under the conditions, of room temperature (20-25° C.) and relative humidity of 50±5% and weighed to find the weight, $W_a$ (g)

Inside a petri dish 150 mm in diameter, a glass filter 90 mm in diameter (pore diameter 100-120 μm; made by Sogo Rikagaku Glass Seisakusho K.K.) was placed and deionized water (20-25° C., electric conductivity not more than 5 μS/cm) was added thereto till a height flush with the upper surface of the glass filter.

Subsequently, the measuring cell mentioned above was mounted on the glass fiber mentioned above and the water absorbent resin was allowed to absorb the deionized water. During the course of the water absorption, the deionized water was supplied as required by way of replenishment so as to keep the level of the deionized water constant. After the elapse of 10 minutes thence, the measuring cell mentioned above was weight to find the weight, $W_b$ (g). The water absorbing speed (absorption capacity in deionized water for 10 minutes) (g/g) was calculated in accordance with the following formula using $W_a$ and $W_b$.

$$\text{Absorption capacity (g/g)}=(W_b(g)-W_a(g))/\text{weight of the water absorbent resin (1.0 g)}$$

(3) Germination Index and Rhizogenesis Index

For the purpose of evaluating the influence of the water retaining material for cultivating plant on a plant, seeds were tested for germination in a culture medium prepared by causing a sample of water retaining material for cultivating plant to absorb deionized water (water absorbing gel). The seeds of white radish sprouts which were commercially available (such as, for example, the seeds of white radish sprouts having a germination ratio of not less than 85% and procured from Takii Shubyo K.K.) were used because they allowed the test for germination index to be performed in a short span of time.

A gel culture medium formed of a sample of water absorbent resin (saturated absorption capacity 100 g/g of gel culture medium) was produced by first placing 150 ml of deionized water in a polypropylene fial 250 mm in height, then weighing out 1.5 g of the sample of water absorbent resin and introducing it into the fial, and allowing the contents of the fial to stand for one hour. The gel culture medium of a sample of water absorbent resin having a saturated absorption capacity of less than 100 times the original volume was produced by properly adjusting the amount of the water absorbent resin to be charged in consideration of the saturated absorption capacity of the water retaining material for cultivating plant (In the production of the gel culture medium having a saturated absorption capacity of 30 g/g, a sample weighing 5 g was charged, for example). Subsequently, 30 seeds of the aforementioned white radish sprouts were sown on the culture medium and, with the fial covered with non-woven fabric, cultured in a culture chamber for one week to induce germination. After the elapse of one week, the germinating white radish sprouts were taken out of the fial and the individual germinating plants were measured from the basal parts (points of ramification between roots and stems) through the tips of leaves to find cauline leaf lengths (lengths of aerial parts: $L_1$). The lengths of the underground parts were determined as the lengths of roots of the individual germinating plants from the basal parts through the tips of main roots (lengths of root: $L_2$).

Incidentally, for the purpose of performing comparison between separate test as accurately as permissible in the germinating index test, a water absorbent resin of a cross-linked polymer of polyacrylic acid neutralized with 75% sodium salt and containing no polyvalent metal compound was used as a control sample. The relative value (%) of the length of cauline leaf (aerial length: $L_3$ (mm)) and the length of root (underground length: $L_4$ (mm)) was calculated in accordance with the following formula to determine the average value of 30 sown seeds and report the germination index and the rhizogenesis index. The seeds which failed to shoot buds and roots were each designated as possessing a germination index of 0 and a rhizogenesis index of 0. Then, as regards the power of root growth, the sample plants were visually inspected to determine whether or not their root hairs had grown. The control samples will be described more specifically herein below.

Germination index=$L_1/L_3 \times 100$

Rhizogenesis index=$L_2/L_4 \times 100$ (4) Evaluation of Efficiency of Irrigation In a measuring cell having a 400 mesh (aperture 38 μm) of stainless steel fused to the bottom of a plastic supporting cylinder 60 mm in inside diameter, a sample, 1.0 g, of water absorbent resin and 50 g of glass beads about 1 mm in diameter as model sand were sprayed and mixed. Then, a gel culture medium was produced by pouring deionized water at a flow rate of 1000 g/minute from above the cell to the mesh on the bottom surface for one minute and passing water thereto. Subsequently, 20 seeds of the aforementioned white radish sprouts were sown on the gel culture medium and, with the fial covered with non-woven fabric, left standing outdoors for 8 hours in the daytime and in the culture chamber for 16 hours during the night each day continuously for two weeks. During this continued standing, the white radish sprouts were observed for growth. The standard for judgment concerning the evaluation of germination in terms of efficiency of irrigation is shown below.

◯: A sample showing a germination ratio of not less than 90%, sufficient growth of stems, leaves, and roots, and sufficient growth of root hairs.

◯-Δ: A sample showing a germination ratio of not less than 90%, a discernible sign of growth of stems, leaves, and roots and growth of root hairs, and a sign of wither during the course of the test in one half of the germinating seeds.

Δ: A sample showing a germination ratio of not less than 90%, a discernible sign of growth of stems, leaves, and roots and growth of root hairs, but a sign of wither during the course of the test in all the germinating seeds.

x: A sample showing a sign of germination, only insufficient growth of stems, leaves, and roots and no growth of root hairs, and a sign of wither during the course of the test in all the germinating seeds.

xx: A sample showing no sign of germination.

(5) Weight Average Particle Diameter (Mass Average Particle Diameter)

A sample powder of water absorbent resin was screened through JIS (Japanese Industrial Standard) standard sieves of 5600 μm, 4750 μm, 4000 μm, 3350 μm, 2800 μm, 2360 μm, 2000 μm, 1700 μm, 1400 μm, 1000 μm, 850 μm, 600 μm, 500 μm, 425 μm, 300 μm, 212 μm, 150 μm, 106 μm, and 75 μm. The residue percentages consequently found were plotted on a logarithmic probability paper. Consequently, the reading of a weight average particle diameter (D50) was obtained. When the aforementioned sieves were not available, this determination can be performed by properly selecting sieves by consulting the JIS standard sieves.

The screening was effected by placing 10 g of a sample powder of water absorbent resin on JIS standard sieves mentioned above under the conditions of room temperature (20-25° C.) and relative humidity of 50% RH and shaking the sieves with a low tap type sieve shaking device (rotational frequency 230 rpm and frequency of impulse 130 rpm; made by Iida Seisakusho K.K. and sold under the trademark designation of "ES-65 Type Sieve Shaking Machine") for 10 minutes. Incidentally, the term "weight average particle diameter (D50)" refers to the particle diameter of the standard sieve corresponding to 50 wt % of all the particles passed through standard sieves of prescribed apertures as described in the specification of U.S. Pat. No. 5,051,259, for example.

(6) Hygroscopic Fluidity (Anti-Caking Property/Anti-Blocking Property)

A sample, about 2 g, of water absorbent resin which had passed a JIS 20 mesh (aperture 850 μm) was uniformly scattered in an aluminum cup 52 mm in diameter and then left standing for one hour in a thermo-hygrostat adjusted to a temperature of 25° C.±1° C. and a relative humidity of 90±5%. After the elapse of the one hour, the sample of water absorbent resin held in the aluminum cup was moved onto a JIS standard sieve of 8.6 mesh (aperture 2,000 μm) (The IIDA TESTING SIEVE: 80 mm in inside diameter) and shaken with a low tap type sieve shaking device (rotational frequency 230 rpm and frequency of impulse 130 rpm; made by Iida Seisakusho K.K. and sold under the trademark designation of "ES-65 Type Sieve Shaking Machine") under the conditions of a room temperature (20-25° C.) and a relative humidity of 50% RH for 5 seconds to determine the weight (Ag) of the water absorbent resin stopped on a 2000 μm mesh and the weight (Bg) of the water absorbent resin passing the mesh. In this invention, the hygroscopic fluidity was calculated in accordance with the following formula.

Hygroscopic fluidity (weight %)=$(A(g)/A(g)+B(g))) \times 100$

In the present invention, the hygroscopic fluidity (Anti-caking property/Anti-blocking property) manifests excellent fluidity as lowering the value.

As mentioned above, although particles of the water absorbent resin (A) composed in the water retaining material for cultivating plant passed through a JIS 20 mesh (aperture 850 μm) is used for measuring the hygroscopic fluidity, the hygroscopic fluidity of particles not passed through aperture 850 μm is adapted the value of particles passed aperture 850 μm is adapted. When all particles of the water absorbent resin (A) do not pass through aperture 850 μm, the hygroscopic fluidity is measured using aperture 2000 μm instead of a JIS 20 mesh (aperture 850 μm). When all particles of the water absorbent resin (A) do not pass through aperture 2000 μm, the hygroscopic fluidity is measured after crushing the water absorbent resin in a suitable size.

(7) Amount of Water-Soluble Component (Amount of Soluble Component) of Water Absorbent Resin From a sample, 0.5 g, of water absorbent resin, the water-soluble component was extracted by dispersing the sample in 1000 ml of deionized water, stirring it for 16 hours, and then allowing the stirred sample to stand. After the elapse of the 16 hours, the extract was filtered with one filter paper (thickness 0.26 mm and diameter of retained particles 5 μm; made by Advantec Toyo K.K. and sold under the product name of "JIS P 3801, No. 2). The filtrate, E (g), was recovered in an egg-plant-shaped flask and heated at 80° C. and wholly concentrated with a rotary evaporator (made by Tokyo Rikaki K.K. and sold under the product code of "Type N"). The concentrated filtrate was placed in an aluminum cup and heated in a hot air oven at 180° C. for three hours. The weight, D (g), of the solid component contained in the filtrate was calculated in accordance with the following formula.

Amount of soluble component (%)={(D(g)×(1,000/E(g)))/0.5}×100

(8) Water Content

The water content of a sample of water absorbent resin was determined by placing the sample, 1,000 mg, in an aluminum cup, heating the sample in a hot air oven at 180° C. for 3 hours, and finding the loss in weight on drying.

Water content (%)=[[(Weight (g) of hydrated polymer before drying)−(weight (g) of polymer after drying)]/(weight of hydrated polymer (g) before drying)]×100

(9) Calcium Gradual Release Index

First, in a vessel of polypropylene (made by Teraoka K.K. and sold under the product code of "Type 24-0210-02") measuring 80 mm in inside diameter and 250 mm in height, 1 L of an aqueous calcium solution having a calcium ion concentration of 200 mg/L and adjusted to 25±0.5° C. was placed and then a 1 g sample of water absorbent resin was introduced into the vessel, and they were stirred with a stirring bar (made by Sogo Rikagaku Glass Seisakusho K.K. and sold under the product code of "1065-10") 50 mm in length and 8 mm in diameter at a rotational frequency of 60 rpm for 48 hours. The stirring was performed in a thermostat kept at a temperature of 25±1° C. After the 48 hours' stirring, the aqueous calcium chloride solution having the water absorbent resin dispersed therein was collected with a disposable syringe (inner volume 30 ml; made by Thermo K.K. and sold under the product code of "SS-30ES") and the water absorbent resin reduced to a swelled gel was separated by filtration by the use of a filter (made by GL Science K.K. and sold under the product code of "Type 25A") to recover an aqueous calcium solution. The recovered aqueous calcium solution was assayed by plasma emission spectral analysis to determine the amount of calcium (X mg/L). Besides, 1 L of an aqueous calcium chloride solution having a calcium ion concentration of 200 mg/L and having no water absorbent resin dispersed therein was directly stirred with the stirring bar mentioned above for 48 hours under the aforementioned conditions. The aqueous solution stirred and passed the aforementioned disposable syringe and filter was assayed by plasma emission spectral analysis by way of a blank test to determine the amount of calcium (Y mg/L). The calcium gradual release index was calculated in accordance with the following formula.

Calcium gradual release index (mg/L)=X−Y

(10) Evaluation of Soil

A culture medium for evaluation was prepared by mixing a sample, 5 g, of water absorbent resin and 50 g of a culture soil (made by Takii Shubyo K.K. and sold under the trademark designation of "Takii Culture Soil"), placing the resultant mixture in a flowerpot (measuring 16 cm in diameter and 12 cm in height) of vinyl resin furnished with a metal gauze having a bottom hole 38 μm in aperture, and subsequently pouring 500 g of tap water into the flowerpot. Subsequently, young seedlings of an annual edible vegetable (produced by growing seeds made by Takii Shubyo K.K. in the aforementioned culture soil for one week) were planted in the culture medium and irrigated with 500 g of tap water at invervals of two weeks. The young seedlings held in the flowerpot were grown for two months in the environment of 8 hours of standing outdoors in the day time and 16 hours of standing in a culture chamber (kept at 25° C. and a relative humidity of 70±5% RH) during the night. The seedlings after the two months of standing were inspected to find the state of growth, the number of leaves, and the condition of coloring.

Referential Example 1

A reaction solution was obtained by dissolving 12.0 g of polyethylene glycol diacrylate (average addition mol number of ethylene oxide 8) in 5500 g of an aqueous solution of a monomer formed of 20 mol % of acrylic acid and 80 mol % of sodium acrylate. Then, this reaction solution was deaerated under the atmosphere of nitrogen gas for 30 minutes. Subsequently, the reaction solution mentioned above was supplied to a reaction vessel formed by furnishing a stainless steel twin arm type kneader furnished with a jacket having an inner volume of 10 L and possessing two sigma type vanes and the reaction system was displaced with nitrogen gas with the reaction solution kept at 30° C. When the reaction solution was continuously stirred and 2.46 g of sodium persulfate and 0.10 g of L-ascorbic acid were added to the stirred reaction solution, the system began polymerizing in about one minutes. Within 60 minutes of starting the polymerization, the hydrated gel-like polymer was extracted. The hydrated gel-like polymer thus obtained was found to be finely divided to a diameter of about 5 mm. The finely divided hydrated gel-like polymer was spread on a metal gauze of 50 mesh (aperture 300 μm) and dried with hot air at 150° C. for 90 minutes. The dried product thus obtained was pulverized by the use of a shaking mill, further classified with a metal gauze and adjusted, with the result that an amorphous crushed water absorbent resin (1) was obtained. Incidentally, the water absorbent resin (1) was used as a control sample for the aforementioned test for seed germinating power (germination index).

Referential Example 2

An amorphous crushed water absorbent resin (2) was obtained by following the procedure of Referential Example 1 while changing the monomer in the aqueous solution of monomer to a monomer formed of 30 mol % of acrylic acid and 70 mol % of sodium acrylate (monomer concentration 38 wt. %).

Referential Example 3

An amorphous crushed water absorbent resin (3) was obtained by following the procedure of Referential Example 1 while changing the monomer in the aqueous solution of monomer to a monomer formed of 60 mol % of acrylic acid and 40 mol % of sodium acrylate (monomer concentration 38 wt. %).

Referential Example 4

An amorphous crushed water absorbent resin (4) was obtained by following the procedure of Referential Example 1 while changing the monomer in the aqueous solution of monomer to a monomer formed of 80 mol % of acrylic acid and 20 mol % of sodium acrylate (monomer concentration 38 wt. %).

Referential Example 5

A reaction solution was prepared by mixing 150 g of an aqueous monomer solution containing a monomer formed of 40 mol % of acrylic acid and 60 mol % of sodium acrylate at a concentration of 55 wt. %, 0.11 g of polyethylene glycol diacrylate (average addition mol number of ethylene oxide 8), and 0.13 g of sodium persulfate as an initiator. The reaction solution was deoxidized by having nitrogen gas bubble therethrough for 30 minutes and then poured into a vessel of stainless steel having nitrogen gas sealed therein, including a bottom surface of 200 mm×260 mm, coated with Teflon (registered trademark), and placed on a hot plate (made by Inai Seieido K.K. and sold under the trademark designation of 'NEOHOTPLATE HI-1000"). The reaction solution was quickly polymerized immediately after it was poured in the vessel to afford a hydrated gel-like polymer. The hydrated gel-like polymer thus obtained was pulverized in a vertical grinder furnished with a screen having a pore diameter of 1.5 mm (made by Orient K.K. and sold under the product code of "Type VM27-S") by operating a rotary blade of the grinder at a peripheral speed of 7 m/sec, and further classified with a metal gauze, and adjusted to afford an amorphous crushed water absorbent resin (5).

Referential Example 6

A water absorbent resin (6) was obtained by spreading the water absorbent resin (4) on a metal gauze having an aperture of 38 μm and drying it with hot, air at 150° C. for 90 minutes.

Referential Example 7

A water absorbent resin (7) was obtained by following the procedure of Referential Example 1 while preparing a reaction solution by dissolving 12.0 g of polyethylene glycol diacrylate (average addition mol number of ethylene oxide 8) in 5500 g of an aqueous acrylic acid solution (monomer concentration 38 wt %).

The results of the water absorbent resins (1)-(7) are described in Table 1. These resins were rated for the germination power index by using a gel culture medium having a deionized water swelling ratio of 70 times the original volume. The results which were obtained in the working examples and the comparative examples cited herein below are also described in Table 1.

Referential Example 8

A reaction solution was prepared by mixing 150 g of an aqueous solution of a monomer formed of 50 mol % of acrylic acid and 50 mol % of sodium acrylate and contained in the solution at a concentration of 65 wt. %, 0.11 g of polyethylene glycol diacrylate (the average addition mol number of ethylene oxide 8), and 0.13 g of sodium persulfate as an initiator. The reaction solution was deoxidized by having nitrogen gas bubble therethrough for 30 minutes and then poured into a vessel of stainless steel having nitrogen gas sealed therein, including a bottom surface of 200 mm×260 mm, coated with Teflon (registered trademark), and placed on a hot plate (made by Inai Seieido K.K. and sold under the trademark designation of 'NEOHOTPLATE HI-1000"). The reaction solution quickly polymerized immediately after it was poured into the vessel to afford a hydrated gel-like polymer. An amorphous crushed water absorbent resin (8) was obtained by pulverizing the hydrated gel-like polymer in a vertical grinder furnished with a screen having a pore diameter of 1.5 mm (made by Orient K.K. and sold under the product code of "Type VM27-S") by operating a rotary blade of the grinder at a peripheral speed of 7 m/sec, and further classifying and adjusting the polymer with a metal gauze.

Referential Example 9

A complex inorganic compound (1) was obtained by placing 500 g of calcium sulfate dihydrate (solubility 0.27 g in 100 g of deionized water at 20° C.), 200 g of magnesium oxide (solubility 0.60 mg in 100 g of deionized water at 20° C.), 10 g of iron oxide (III) (solubility less than 10 mg in 100 g of deionized water at 20° C.), and 10 g of zinc oxide (solubility 0.40 mg in 100 g of deionized water at 20° C.) in a Lödige mixere (made by Lödige K.K. and sold under the product code of "Type M5R") and mixing them by stirring at 330 rpm for 15 seconds.

Referential Example 10

An inorganic compound (2) was obtained by placing 500 g of calcium hydroxide and 500 g of an ash formed by adjusting the grain size of the ash of sludge incinerator (solubility 12 mg in 100 g of deionized water at a super ash 20 of the following composition: Tokyo Drainage Bureau) in a Lödige mixere (made by Lödige K.K. and sold under the product code of "Type M5R") and mixing them by stirring at 330 rpm for 15 seconds.

TABLE 1

| $SiO_2$ | $Al_2O_3$ | $Fe_2O_3$ | MgO | CaO | $K_2O$ | $P_2O_5$ | CuO | ZnO | Others |
|---|---|---|---|---|---|---|---|---|---|
| 32.1 | 14.5 | 9.6 | 2.3 | 15.1 | 2.3 | 16.7 | 0.2 | 0.5 | 6.7 |

Referential Example 11

An inorganic compound (3) was obtained by placing 200 g of magnesium oxide and 100 g of zinc oxide in a Lödige mixer (made by Lödige K.K. and sold under the product code of "Type M5R") and mixing them by stirring at 330 rpm for 15 seconds.

Example 1

A water retaining material for cultivating plant (1) was obtained by placing 300 g of the water absorbent resin (3) in a Lödige mixer (made by Lödige K.K. and sold under the product code of "Type M5R"), adding 60 g of a slurry containing calcium sulfate at a concentration of 50 wt. % dropwise to the absorbing resin, mixing them by stirring at 330 rpm for 15 seconds, drying the resultant mixture with hot air at 120° C. for 10 minutes, and passing the dried mixture through a metal gauze having an aperture of 2 mm.

Example 2

A water retaining material for cultivating plant (2) was obtained by following the procedure of Example 1 while using calcium hydroxide (produced by Wakojunyaku K.K., average particle diameter 30 μm) in the place of calcium sulfate.

Example 3

A water retaining material for cultivating plant (3) was obtained by following the procedure of Example 0.1 while using calcium carbonate (produced by Wakojunyaku K.K., average particle diameter 10 μm) in the place of calcium sulfate Example 4

A water retaining material for cultivating plant (4) was obtained by following the procedure of Example 1 while using 120 g of a slurry containing calcium sulfate at a concentration of 50 wt. %.

Example 5

A water retaining material for cultivating plant (5) was obtained by following the procedure of Example 1 while using calcium oxide (produced by Wakojunyaku K.K., average particle diameter 20 μm) in the place of calcium sulfate.

Example 6

A water retaining material for cultivating plant (6) was obtained by adding 6 g of a commercial product, Epomin P-1050, (an aqueous solution containing polyethylene imine of a number average molecular weight of about 70,000 at a concentration of 50%; made by Nippon Shokubai K.K.) dropwise to 100 g of the water absorbent resin (2), mixing them by agitation, further adding 40 g of a slurry containing calcium sulfate at a concentration of 50 wt. % dropwise to the resultant mixture and mixing them, drying the resultant mixture with hot air at 120° C. for 10 minutes, and passing the dried mixture through a metal gauze having an aperture of 2 mm.

Example 7

A water retaining material for cultivating plant (7) was obtained by mixing 100 g of the water absorbent resin (2) and a surface cross-linking agent formed of 0.5 part of propylene glycol, 0.3 part of 1,4-butane diol, and 3 parts of water, heat-treating the resultant mixture at 200° C. for 45 minutes, subsequently adding 30 g of a slurry containing calcium sulfate at a concentration of 50 wt. % dropwise to the mixture, drying the produced mixture with hot air at 0.120° C. for 10 minutes, and passing the dried mixture through a metal gauze having an aperature of 2 mm.

Example 8

A water retaining material for cultivating plant (8) was obtained by placing 500 g of the water absorbent resin (5) in a reaction vessel formed by fitting a lid to a jacketed twin arm type kneader of stainless steel possessing two sigma type vanes and having an inner volume of 10 L, then stirring the water absorbent resin (5) for 10 minutes, with the jacket kept at a temperature of 70° C. and the kneader closed with a lid, subsequently mixing the produced mixture with 80 g of calcium sulfate dihydrate as kept stirred, drying the produced mixture with hot air at 120° C. for 10 minutes, and passing the dried mixture through a metal gauze having an aperture of 2 mm.

Example 9

A water retaining material for cultivating plant (9) was obtained by placing 100 g of the water absorbent resin (4) and 20 g of calcium sulfate dihydrate in a Lödige mixer (made by Lödige K.K. and sold under the product code of "Type M5R"), mixing them by stirring at 330 rpm for 15 seconds, subsequently spraying 10 g of water into the Lödige mixer and further mixing the contents thereof for 15 seconds, drying the produced mixture with hot air at 120° C. for 10 minutes, and passing the dried mixture through a metal gauze having an aperture of 2 mm.

Example 10

A water retaining material for cultivating plant (10) was obtained by following the procedure of Example 9 while changing the water absorbent resin (4) to the water absorbent resin (6).

Example 11

A water retaining material for cultivating plant (11) was obtained by following the procedure of Example 1 while using the water absorbent resin (7) in the place of the water absorbent resin (3).

Example 12

A water retaining material for cultivating plant (12) was obtained by placing 300 g of the water absorbent resin (8) and 60 g of calcium sulfate dihydrate (produced by Wakojunyaku K.K., average particle diameter 30 μm) in the form of powder in the Lödige mixer described in Example 1, mixing them at 330 rpm for one minute, and passing the resultant mixture through a metal gauze having an aperture of 2 mm.

Example 13

A water retaining material for cultivating plant (13) was obtained by placing 300 g of the water absorbent resin (8) and 60 g of calcium sulfate dihydrate (produced by Wakojunyaku K.K., average particle diameter 30 μm) in the form of powder in the Lödige mixer described in Example 1, mixing them at 330 rpm for one minute, spraying 9 g of deionized water into the mixer, further mixing them together at 330 rpm for one minute, and passing the resultant mixture through a metal gauze having an aperture of 2 mm.

Example 14

A water retaining material for cultivating plant (14) was obtained by following the procedure of Example 1 while using 120 g of a slurry containing the inorganic mixture (1) at a concentration of 50 wt. % in the place of calcium sulfate.

Example 15

A water retaining material for cultivating plant (15) was obtained by following the procedure of Example 1 while using 120 g of a slurry containing the inorganic mixture (2) at a concentration of 50 wt. % in the place of calcium sulfate.

Example 16

A water retaining material for cultivating plant (16) was obtained by following the procedure of Example 1 while using 120 g of a slurry containing an ash of coal incineration (made by Nippon Fly Ash Association and sold under the trademark designation of "Fly Ash" having a composition shown in the following table; solubility in 100 g of deionized water at 20° C. 8.0 mg) at a concentration of 50 wt. % in the place of calcium sulfate.

TABLE 2

| $SiO_2$ | $Al_2O_5$ | $Fe_2O_3$ | MgO | CaO | $K_2O$ | $P_2O_5$ | CuO | ZnO | Others |
|---|---|---|---|---|---|---|---|---|---|
| 44.6 | 16.4 | 3.1 | 2.8 | 15.0 | 3.1 | 8.3 | 0.2 | 0.1 | 6.4 |

Example 17

A mixed soil was prepared by mixing 3 g of the water retaining material for cultivating plant (1) and such an amount of a culture soil (made by Takii Shubyo K.K. and sold under the trademark designation of "Takii Culture Soil") that the water retaining material for cultivating plant would account for a proportion of 20 wt. % based on the total amount of the water retaining material for cultivating plant and the culture coil. Subsequently, a culture medium for evaluation was prepared by placing the mixed soil in a flowerpot (measuring 8 cm in bottom surface diameter, 12 cm in upper surface diameter, and 10 cm in height) of vinyl resin furnished with a metal gauze having a bottom hole 38 μm in aperture and pouring 200 g of tap water (supplied in Himeji city) into the flowerpot. In the culture medium, 25 young seedlings of an annual edible vegetable (made by Takii Shubyo K.K.) were sown and were kept under observation for two weeks to find the condition of germination power. The result is shown in FIG. 1 (A).

For comparison, the water absorbent resin (1) picked in the place of the water retaining material for cultivating plant (1) and the culture soil were mixed in such amounts that the water retaining material for cultivating plant would account for 20 wt. % based on the total amount of the water absorbent resin and the culture soil and further 0.3 g of calcium sulfate was mixed therewith. Then 200 g of tap water (supplied in Himeji city) was poured into the flowerpot and the same procedure for inspecting the condition of germination power was continued for two weeks. The result is shown in FIG. 1 (D).

Besides, the adjusted culture medium mixed with the water absorbent resin (1) and a soil (see FIG. 1 (B).), and the condition of the growth effected only in the culture soil without using any water retaining material for cultivating plant ((see FIG. 1 (C).) were also kept under observation.

Example 18

Figure 2:
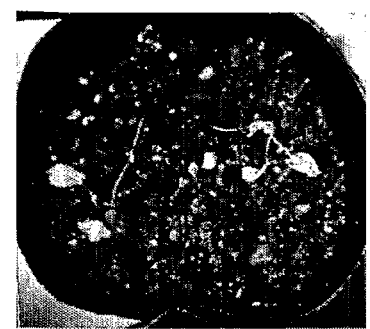
FIG. 2 is a drawing to show results of plants growth in Example 18.
(A) Used culture medium mixed with water retaining material for cultivating plant (5) and culture soil.
(B) Used culture soil only.
(C) Used culture medium mixed with water absorbent resin (1) and culture soil.
Figure 2:
Figure 2:
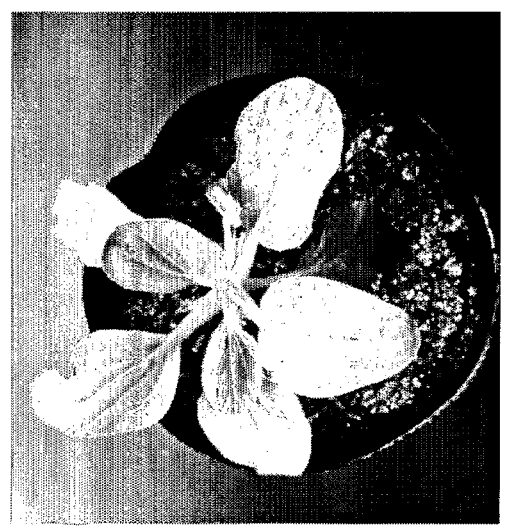

A culture medium for use in evaluation was prepared by mixing 3.5 g of the water retaining material for cultivating plant (5) and 50 g of the culture soil (made by Takii Shubyo K.K. and sold under the trademark designation of "Takii Culture Soil"), placing the resultant mixture in a flowerpot (measuring 10 cm in bottom surface diameter, 15 cm in upper surface diameter, and 12 cm in height) of vinyl resin furnished with a metal gauze having a bottom hole 38 um in aperture, and subsequently pouring 500 g of tap water into the flowerpot. Subsequently, five young seedlings of an annual edible vegetable (made by Takii Shubyo K.K.) were sown in the culture medium. The seedlings were kept irrigated with 500 g of tap water at intervals of three weeks and were grown for two months under the environment of 8 hours of standing outdoors in the day time and 16 hours of standing in a culture chamber (kept at 25° C. and a relative humidity of 70±5% RH) during the night. After the elapse of four months thence, the condition of the growth was inspected. The result is shown in FIG. 2 (A).

For comparison, the same procedure was performed by using the water absorbent resin (1) in the place of the water retaining material for cultivating plant (5) with the object of observing the condition of the growth of the white radish sprouts. The result is shown in FIG. 2 (C).

Besides, the condition of the growth effected only in the culture soil without using any water retaining material for cultivating plant was kept under observation. The result is shown in FIG. 2 (B).

Comparative Example 1

A water retaining material for cultivating plant (1) for comparison was obtained by following the procedure of Example 1 while using the water absorbent resin (1) in the place of the water absorbent resin (3).

Comparative Example 2

A reaction solution was formed by mixing 230 g of acrylic acid, 133 g of sodium hydroxide having a concentration of 48 wt. %, 0.5 g of N,N'-methylene bisacrylamide, and 636 g of water in a beaker having an inner volume of 1000 ml. The reaction solution had the ambient air displaced with nitrogen gas till the oxygen concentration thereof decreased to not more than 0.1 ppm. The reaction solution was subsequently poured into a vessel of stainless steel having nitrogen gas sealed therein, furnished with a bottom surface of 200 mm×260 mm, and coated with Teflon (registered trademark). The reaction solution was cooled to 10° C. Subsequently, 0.023 g of an aqueous 3.5 wt. % hydrogen peroxide solution, 0.00575 g of L-ascorbic acid, and 0.20 g of sodium persulfate were added to the reaction solution. Within about 30 minutes of making this addition, the reaction solution began to polymerize. The polymerizing reaction solution which reached the peak temperature about two hours thereafter was further aged to afford a hydrated gel-like polymer. The gel-like polymer thus obtained was placed in a reaction vessel formed by attaching a lid to a jacketed twin arm type kneader possessing two sigma type vanes and having an inner volume of 10 L and was disintegrated by agitation for about two hours. The disintegrated polymer and 35.5 g of an aqueous 50 wt. % calcium chloride solution were mixed, stirred in the reaction vessel for about two hours. Then, the produced mixture was spread on a metal gauze of 50 mesh (aperture 300 μm) and dried with hot air at 110° C. for 120 minutes. Then, the dried mixture consequently obtained was pulverized by the use of a shaking mill, further classified with a metal gauze, and homogenized to afford a water retaining material for cultivating plant (2) for comparison.

Comparative Example 3

A water retaining material for cultivating plant (3) for comparison was obtained by swelling 10 g of the water absorbent resin (1) with 4000 g of distilled water, adding the swelled resin and 1000 g of an aqueous 0.28 wt. % calcium chloride solution together, stirring the resultant mixture and allowing it to stand for two hours, separating the swelled gel-like mixture through a filter cloth, spread on a metal gauze having an aperture of 38 μm, and dried with hot air. Subsequent, the dried mixture thus obtained was pulverized by the use of a shaking mill, further classified with a metal gauze, and homogenized to afford a water retaining material for cultivating plant (3) for comparison.

Comparative Example 4

A water retaining material for cultivating plant (4) for comparison was obtained by following the procedure of Comparative Example 3 while using calcium nitrate in the place of calcium chloride.

Comparative Example 5

A water retaining material for cultivating plant (5) for comparison was obtained by following the procedure of Example 1 while using 6 g of a slurry containing magnesium phosphate (solubility 20 mg in 100 g of deionized water at 20° C.) at a concentration of 50 wt. % in the place of calcium sulfate.

Comparative Example 6

A water retaining material for cultivating plant (6) for comparison was obtained by following the procedure of Example 1 while using 60 g of a slurry containing magnesium phosphate at a concentration of 50 wt. % in the place of calcium sulfate.

Comparative Example 7

A water retaining material for cultivating plant (7) was obtained by following the procedure of Example 1 while using the inorganic mixture (3) in the place of calcium sulfate.

Comparative Example 8

Across-linked article of N-vinyl acetamide (made by Showa Denko K.K. and sold under the trademark designation of "Noniolex NA-500M") was used as a water retaining material for cultivating plant (8) for comparison.

Comparative Example 9

A water retaining material for cultivating plant (9) was obtained by following the procedure of Example 1 while changing the water absorbent resin (3) to the water absorbent resin (2) and using 6 g of a slurry containing calcium phosphate (solubility 25 mg in 100 g of deionized water at 20° C.) at a concentration of 50 wt. %.

TABLE 3

| | Resin or Material | Polyvalent compound | Amount of ion (mol %) | Water absorbing speed (g/g) | Water soluble component (%) | Water content (%) | Saturated absorption capacity (g/g) | Hygroscopic fluidity (wt. %) | 150 μm pass (w %) | Average particle diameter (μm) |
|---|---|---|---|---|---|---|---|---|---|---|
| Ref. Ex. 1 | WAR. (1) | — | 80 | 25 | 20 | 5 | 550 | 93 | 25 | 390 |
| Ref. Ex. 2 | WAR. (2) | — | 70 | 23 | 10 | 5 | 450 | 90 | 9 | 420 |
| Ref. Ex. 3 | WAR. (3) | — | 40 | 21 | 8 | 5 | 420 | 90 | 9 | 520 |
| Ref. Ex. 4 | WAR. (4) | — | 20 | 15 | 9 | 6 | 360 | 98 | 8 | 510 |
| Ref. Ex. 5 | WAR. (5) | — | 60 | 24 | 8 | 5 | 400 | 95 | 7 | 430 |
| Ref. Ex. 6 | WAR. (6) | — | 60 | 23 | 8 | 6 | 400 | 95 | 7 | 420 |
| Ref. Ex. 7 | WAR. (7) | — | 0 | 4 | 7 | 7 | 320 | 99 | 9 | 440 |
| Ref. Ex. 8 | WAR. (8) | — | 50 | 20 | 10 | 13 | 400 | 95 | 5 | 480 |
| Example 1 | WRM (1) | $CaSO_4$ | 40 | 145 | 5 | 9 | 380 | 6 | 7 | 550 |
| Example 2 | WRM (2) | $Ca(OH)_2$ | 40 | 165 | 5 | 8 | 390 | 6 | 8 | 500 |
| Example 3 | WRM (3) | $CaCO_3$ | 40 | 127 | 5 | 9 | 390 | 7 | 8 | 510 |
| Example 4 | WRM (4) | $CaSO_4$ | 40 | 164 | 5 | 8 | 350 | 5 | 8 | 520 |
| Example 5 | WRM (5) | CaO | 40 | 127 | 5 | 9 | 390 | 4 | 8 | 500 |
| Example 6 | WRM (6) | CaSO | 70 | 164 | 6 | 9 | 410 | 5 | 9 | 500 |
| Example 7 | WRM (7) | $CaSO_4$ | 70 | 152 | 5 | 3 | 290 | 5 | 8 | 480 |
| Example 8 | WRM (8) | $CaSO_4$ | 60 | 150 | 6 | 5 | 390 | 5 | 8 | 440 |
| Example 9 | WRM (9) | $CaSO_4$ | 20 | 80 | 6 | 6 | 330 | 6 | 8 | 520 |
| Example 10 | WRM (10) | $CaSO_4$ | 60 | 120 | 6 | 6 | 380 | 6 | 8 | 440 |
| Example 11 | WRM (11) | $CaSO_4$ | 0 | 20 | 3 | 6 | 280 | 9 | 9 | 500 |
| Example 12 | WRM (12) | $CaSO_4$ | 50 | 150 | 8 | 15 | 400 | 7 | 6 | 490 |
| Example 13 | WRM (13) | $CaSO_4$ | 50 | 155 | 8 | 18 | 400 | 5 | 6 | 480 |
| Example 14 | WRM (14) | $CaSO_4 \cdot 2H_2O$, MgO, FeO (III), ZnO | 40 | 130 | 6 | 9 | 370 | 3 | 6 | 540 |

TABLE 3-continued

| | Resin or Material | Polyvalent compound | Amount of ion (mol %) | Water absorbing speed (g/g) | Water soluble component (%) | Water content (%) | Saturated absorption capacity (g/g) | Hygroscopic fluidity (wt. %) | 150 μm pass (w %) | Average particle diameter (μm) |
|---|---|---|---|---|---|---|---|---|---|---|
| Example 15 | WRM (15) | Ca(OH)$_2$, Super ash | 40 | 140 | 5 | 8 | 370 | 5 | 9 | 500 |
| Example 16 | WRM (16) | Fly ash | 40 | 130 | 6 | 9 | 360 | 5 | 9 | 500 |
| Comp. Ex. 1 | WRM (1) for com. | MgO, ZnO | 80 | 70 | 15 | 8 | 430 | 8 | 25 | 390 |
| Comp. Ex. 2 | WRM (2) for com. | CaSO$_4$ | 50 | 6 | 3 | 7 | 300 | 88 | 14 | 450 |
| Comp. Ex. 3 | WRM (3) for com. | CaCl$_2$ | 80 | 5 | 3 | 5 | 250 | 78 | 16 | 430 |
| Comp. Ex. 4 | WRM (4) for com. | CaCl$_2$ | 80 | 5 | 4 | 5 | 270 | 90 | 12 | 520 |
| Comp. Ex. 5 | WRM (5) for com. | Ca(NO$_3$)$_2$ | 70 | 160 | 10 | 6 | 450 | 10 | 6 | 450 |
| Comp. Ex. 6 | WRM (6) for com. | MgPO$_3$ | 40 | 150 | 8 | 8 | 370 | 5 | 9 | 430 |
| Comp. Ex. 7 | WRM (7) for com. | MgPO$_3$ | 40 | 150 | 8 | 8 | 370 | 5 | 18 | 410 |
| Comp. Ex. 8 | WRM (8) for com. | MgO, ZnO | — | 1.5 | 5 | 10 | 30 | 90 | 5 | 570 |
| Comp. Ex. 9 | WRM (9) for com. | — | 70 | 180 | 10 | 6 | 440 | 10 | 6 | 450 |

WAR: Water absorbent resin,
WRM: Water retaining material for cultivating plat,
WRM (9) for com.: WRM for compersion,
Amount of ion: Amount of monovalent salt of carboxylic acid relative to total amount of carboxyl groups, which means neutralization ratio of carboxyl group in the water absorbent resin or plant growth grade water retaining material.

TABLE 4

| | Resin or Material | Calcium gradual release index (mg/g) | Germination index (%) | Rhizogenesis index (%) | Condition of root part | Evaluation of irrigation efficiency | White radish sprout growth power — Number of leaves | White radish sprout growth power — Condition of coloration |
|---|---|---|---|---|---|---|---|---|
| Ref. Ex. 1 | WAR. (1) | −200 | 100 | 100 | Absence of root hair | x | 0 | withered |
| Ref. Ex. 2 | WAR. (2) | −150 | 100 | 100 | Absence of root hair | x | 0 | withered |
| Ref. Ex. 3 | WAR. (3) | −30 | 100 | 100 | Absence of root hair | x | 0 | withered |
| Ref. Ex. 4 | WAR. (4) | −20 | 100 | 100 | Absence of root hair | x | 0 | withered |
| Ref. Ex. 5 | WAR. (5) | −100 | 100 | 100 | Absence of root hair | x | 0 | withered |
| Ref. Ex. 6 | WAR. (6) | −100 | 100 | 100 | Absence of root hair | x | 0 | withered |
| Ref. Ex. 7 | WAR. (7) | −5 | 100 | 100 | Absence of root hair | x | 0 | withered |
| Ref. Ex. 8 | WAR. (8) | −80 | 100 | 100 | Absence of root hair | x | 0 | withered |
| Example 1 | WRM (1) | 3.1 | 600 | 600 | Presence of root hair | ○ | 10 | dark green |
| Example 2 | WRM (2) | 3.3 | 600 | 550 | Presence of root hair | ○ | 8 | dark green |
| Example 3 | WRM (3) | 2.6 | 400 | 280 | Presence of root hair | ○ | 9 | dark green |
| Example 4 | WRM (4) | 4.2 | 520 | 560 | Presence of root hair | ○ | 11 | dark green |
| Example 5 | WRM (5) | 5 | 380 | 360 | Presence of root hair | ○ | 8 | dark green |
| Example 6 | WRM (6) | 4.4 | 610 | 560 | Presence of root hair | ○ | 8 | dark green |
| Example 7 | WRM (7) | 4.2 | 580 | 550 | Presence of root hair | ○ | 7 | dark green |
| Example 8 | WRM (8) | 4.4 | 570 | 580 | Presence of root hair | ○ | 8 | dark green |
| Example 9 | WRM (9) | 5 | 520 | 530 | Presence of root hair | ○ | 14 | dark green |
| Example 10 | WRM (10) | 5 | 480 | 430 | Presence of root hair | ○ | 12 | dark green |
| Example 11 | WRM (11) | 2.7 | 520 | 490 | Presence of root hair | ○~Δ | 7 | dark green |
| Example 12 | WRM (12) | 7.1 | 600 | 600 | Presence of root hair | ○ | 12 | dark green |
| Example 13 | WRM (13) | 4.1 | 600 | 700 | Presence of root hair | ○ | 13 | dark green |
| Example 14 | WRM (14) | 2 | 580 | 700 | Presence of root hair | ○ | 7 | dark green |
| Example 15 | WRM (15) | 2 | 500 | 490 | Presence of root hair | ○ | 9 | dark green |
| Example 16 | WRM (16) | 1.2 | 520 | 500 | Presence of root hair | ○ | 8 | dark green |
| Comp. Ex. 1 | WRM (1) for com. | −60 | 120 | 110 | Absence of root hair | xx | 0 | withered |
| Comp. Ex. 2 | WRM (2) for com. | −30 | 520 | 550 | Presence of root hair | Δ | 7 | 2 in LY 5 in green |
| Comp. Ex. 3 | WRM (3) for com. | −20 | 530 | 540 | Presence of root hair | Δ | 6 | 1 in LY 5 in green |
| Comp. Ex. 4 | WRM (4) for com. | −20 | 550 | 540 | Presence of root hair | Δ | 5 | 1 in LY 4 in green |
| Comp. Ex. 5 | WRM (5) for com. | −20 | 220 | 100 | Absence of root hair | x | 0 | withered |
| Comp. Ex. 6 | WRM (6) for com. | −10 | 100 | 100 | Absence of root hair | xx | 0 | withered |
| Comp. Ex. 7 | WRM (7) for com. | −30 | 100 | 100 | Absence of root hair | xx | 0 | withered |
| Comp. Ex. 8 | WRM (8) for com. | 0 | 220 | 180 | Presence of root hair | Δ | 3 | 3 leaves in light yellow |
| Comp. Ex. 9 | WRM (9) for com. | −160 | 130 | 100 | Absence of root hair | xx | 0 | withered |

2 in LY: 2 leaves in light yellow,

INDUSTRIAL APPLICABILITY

A water retaining material for cultivating plant which has excellent water absorbing property and plant growth promoting property is provided. It is advantageously utilized as a novel water retaining material for cultivating plant directed toward soil conditioning and tree planting activities veritably excellent in the efficiency of irrigation and as a plant supporting carriers directed toward decorative plants including cut flowers.

The invention claimed is:

1. A particulate water retaining material for cultivating plant comprising (A) a carboxylic group-containing water-insoluble water absorbent resin and (B) a polyvalent metal compound, which material exhibits an absorption capacity in deionized water for 10 minutes in the range of 20-500 g/g and has a weight average particle diameter in the range of 200-10,000 μm, wherein an amount of a monovalent counterion of the carboxylic group-containing water-insoluble absorbent resin is in a range of 10 to 65 mol %,
  wherein the solubility of (B) said polyvalent metal compound in 100 g of deionized water at 20° C. is more than 0 and not more than 10.0 g,
  wherein (B) said polyvalent metal compound comprises calcium,
  wherein (B) the calcium-containing polyvalent metal compound is contained in the range of 10-50 wt. % based on the weight of said water retaining material for cultivating plant,
  wherein (B) said polyvalent metal compound is present on the surface of (A) said water absorbent resin, and adheres to and/or coats or deposits on the surface of (A) said water absorbent resin,
  wherein (B) the polyvalent metal compound comprises at least one compound selected from the group consisting of, Ca(OH)$_2$, CaCO$_3$, CaO and a combination thereof.

2. A particulate water retaining material for cultivating plant comprising (A) a carboxylic group-containing water-insoluble water absorbent resin and (B) a polyvalent metal compound, and which material exhibits a calcium gradual release index of more than 0 and not more than 50 mg/L and has a weight average particle diameter in the range of 200-10,000 μm, wherein an amount of a monovalent counterion of the carboxylic group-containing water-insoluble absorbent resin is in a range of 10 to 65 mol %,
  wherein the solubility of (B) said polyvalent metal compound in 100 g of deionized water at 20° C. is more than 0 and not more than 10.0 g,
  wherein (B) said polyvalent metal compound comprises calcium,
  wherein (B) the calcium-containing polyvalent metal compound is contained in the range of 10-50 wt. % based on the weight of said water retaining material for cultivating plant,
  wherein (B) said polyvalent metal compound is present on the surface of (A) said water absorbent resin, and adheres to and/or coats or deposits on the surface of (A) said water absorbent resin,
  wherein (B) the polyvalent metal compound comprises at least one compound selected from the group consisting of Ca(OH)$_2$, CaCO$_3$, CaO and a combination thereof.

3. A particulate water retaining material for cultivating plant according to claim 1, wherein the calcium gradual release index is in the range of 1.0-20 mg/L and a saturated absorption capacity is in the range of 20-1,000 g/g.

4. A particulate water retaining material for cultivating plant according to claim 1, wherein a water content of the particulate water retaining material is in the range of 1-30 wt. %.

5. A particulate water retaining material for cultivating plant according to claim 1, wherein (B) said polyvalent metal compound further comprises at least one element selected from the group consisting of magnesium, iron, and silicon.

6. A particulate water retaining material for cultivating plant comprising (A) a carboxylic group-containing water-insoluble water absorbent resin and (B) a polyvalent metal compound, which material exhibits an absorption capacity in deionized water for 10 minutes in the range of 20-500 g/g and has a weight average particle diameter in the range of 200-10,000 μm, wherein an amount of a monovalent counterion of the carboxylic group-containing water-insoluble absorbent resin is in a range of 10 to 65 mol %,
  wherein (B) said polyvalent metal compound comprises calcium,
  wherein (B) the calcium-containing polyvalent metal compound is contained in the range of 10-50 wt. % based on the weight of said water retaining material for cultivating plant,
  wherein (B) said polyvalent metal compound is present on the surface of (A) said water absorbent resin, and adheres to and/or coats or deposits on the surface of (A) said water absorbent resin,
  wherein (B) the polyvalent metal compound comprises at least one compound selected from the group consisting of Ca(OH)$_2$, CaCO$_3$, CaO and a combination thereof.

7. A particulate water retaining material for cultivating plant according to claim 1, wherein (A) said water absorbent resin is a polymer obtained by polymerizing acrylic acid and/or a salt thereof as a monomer.

8. A particulate water retaining material for cultivating plant according to claim 1, wherein the amount of a soluble component of (A) said water absorbent resin is less than 10 wt. %.

9. A method for the production of a water retaining material for cultivating plant comprising (A) a carboxylic acid-group containing water-insoluble particulate water absorbent resin and (B) a polyvalent metal compound, wherein an amount of a monovalent counterion of the carboxylic group-containing water-insoluble absorbent resin is in a range of 10 to 65 mol %, which method comprises a step of mixing (A) said water absorbent resin in a state having a water content in the range of 0-50 wt. % and (B) said polyvalent metal compound in the range of 10-50 wt. % based on the weight of the solid component of (A),
  wherein the solubility of (B) said polyvalent metal compound in 100 g of deionized water at 20° C. is more than 0 and not more than 10.0 g,
  wherein (B) said polyvalent metal compound comprises calcium,
  wherein (B) the calcium-containing polyvalent metal compound is contained in the range of 10-50 wt. % based on the weight of said water retaining material for cultivating plant,
  wherein (B) said polyvalent metal compound is present on the surface of (A) said water absorbent resin, and adheres to and/or coats or deposits on the surface of (A) said water absorbent resin,
  wherein (B) the polyvalent metal compound comprises at least one compound selected from the group consisting of Ca(OH)$_2$, CaCO$_3$, CaO and a combination thereof.

10. A method for the production of a water retaining material for cultivating plant comprising (A) a carboxylic acid-containing water-insoluble particulate water absorbent resin and (B) a polyvalent metal compound, wherein an amount of a monovalent counterion of the carboxylic group-containing water-insoluble absorbent resin is in a range of 10 to 65 mol %, which method comprises a step of mixing (A) said water absorbent resin having a water content in the range of 50-20 wt. % and (B) said polyvalent metal compound in the form of a slurry or a powder containing said polyvalent metal compound at a concentration of not less than 50 wt. %,

- wherein the solubility of (B) said polyvalent metal compound in 100 g of deionized water at 20° C. is more than 0 and not more than 10.0 g,
- wherein (B) said polyvalent metal compound comprises calcium,
- wherein (B) the calcium-containing polyvalent metal compound is contained in the range of 10-50 wt. % based on the weight of said water retaining material for cultivating plant,
- wherein (B) said polyvalent metal compound is present on the surface of (A) said water absorbent resin, and adheres to and/or coats or deposits on the surface of (A) said water absorbent resin,
- wherein (B) the polyvalent metal compound comprises at least one compound selected from the group consisting of $Ca(OH)_2$, $CaCO_3$, CaO and a combination thereof.

11. A method for the production of a water retaining material for cultivating plant comprising (A) a carboxylic acid-containing water-insoluble particulate water absorbent resin and (B) a polyvalent metal compound, wherein an amount of a monovalent counterion of the carboxylic group-containing water-insoluble absorbent resin is in a range of 10 to 65 mol %, which method comprises a step of mixing (A) said water absorbent resin in the state of a powder having a water content in the range of 0-20 wt. % and (B) said polyvalent metal compound in the state of a powder and subsequently adding the resultant mixture and an aqueous liquid or steam together and mixing them,

- wherein the solubility of (B) said polyvalent metal compound in 100 g of deionized water at 20° C. is more than 0 and not more than 10.0 g,
- wherein (B) said polyvalent metal compound comprises calcium,
- wherein (B) the calcium-containing polyvalent metal compound is contained in the range of 10-50 wt. % based on the weight of said water retaining material for cultivating plant,
- wherein (B) said polyvalent metal compound is present on the surface of (A) said water absorbent resin, and adheres to and/or coats or deposits on the surface of (A) said water absorbent resin,
- wherein (B) the polyvalent metal compound comprises at least one compound selected from the group consisting of $Ca(OH)_2$, $CaCO_3$, CaO and a combination thereof.

12. A method according to claim 9, wherein (A) said water absorbent resin is a polymer obtained by polymerizing acrylic acid and/or a salt thereof as a monomer.

13. A method for cultivating plant comprising providing water to a plant from a particulate water retaining material for cultivating plant according to claim 1.

14. A method for cultivating plant according to claim 13, wherein said particulate water retaining material for cultivating plant is mixed with a plant growth grade carrier and the incorporated amount is in the range of 1-30 wt. %.

15. A particulate water retaining material for cultivating plant according to claim 1, wherein (B) said polyvalent metal compound further comprises an ash of incineration.

16. A particulate water retaining material for cultivating plant according to claim 1, wherein the solubility of (B) said polyvalent metal compound in 100 g of deionized water at 20° C. is 0.001 to 5.0 g.

* * * * *